(12) United States Patent
Itabashi

(10) Patent No.: US 10,737,901 B2
(45) Date of Patent: Aug. 11, 2020

(54) PRINTING SYSTEM AND PRINTING METHOD

(71) Applicant: Hanae Itabashi, Tokyo (JP)

(72) Inventor: Hanae Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 16 days.

(21) Appl. No.: 16/273,352

(22) Filed: Feb. 12, 2019

(65) Prior Publication Data
US 2019/0263623 A1   Aug. 29, 2019

(30) Foreign Application Priority Data

Feb. 26, 2018   (JP) .................................. 2018-032492

(51) Int. Cl.
| | |
|---|---|
| *B65H 43/06* | (2006.01) |
| *B65H 31/24* | (2006.01) |
| *B65H 31/04* | (2006.01) |

(52) U.S. Cl.
CPC ............. *B65H 43/06* (2013.01); *B65H 31/04* (2013.01); *B65H 31/24* (2013.01); *B65H 2511/152* (2013.01)

(58) Field of Classification Search
CPC ...... B65H 29/00; B65H 29/001; B65H 29/58; B65H 29/60; B65H 31/00; B65H 31/24; B65H 2404/63; B65H 2405/33–3322; B65H 2511/152; B65H 43/06
See application file for complete search history.

(56) References Cited

U.S. PATENT DOCUMENTS

| | | | |
|---|---|---|---|
| 2014/0339756 A1* | 11/2014 | Harada ..................... | B65H 5/26 271/3.17 |
| 2015/0314978 A1* | 11/2015 | Miyajima .............. | G03B 27/52 271/298 |
| 2018/0141354 A1* | 5/2018 | Yabune ................... | B65H 31/02 |
| 2018/0334351 A1* | 11/2018 | Fujita .................... | G06F 3/1203 |

FOREIGN PATENT DOCUMENTS

| | | |
|---|---|---|
| JP | 2010-202337 | 9/2010 |
| JP | 2016-033624 | 3/2016 |

\* cited by examiner

*Primary Examiner* — Prasad V Gokhale
(74) *Attorney, Agent, or Firm* — IPUSA, PLLC

(57) ABSTRACT

A printing system executes printing of a plurality of copies of a document, and includes first and second paper eject trays. The printing system ejects a plurality of paper sheets of the document to the first or second paper eject tray; detects a full state or a near full state being a predetermined number of paper sheets less than the full state; and ejects the paper sheets of a next copy to the first paper eject tray until the first paper eject tray is full and subsequently to the second paper eject tray, in response to detecting that a total ejectable paper sheet number is greater than or equal to the number of paper sheets of the next copy, the total ejectable paper sheet number being obtained by adding together the numbers of paper sheets that can be ejected to the first and second paper eject trays.

8 Claims, 14 Drawing Sheets

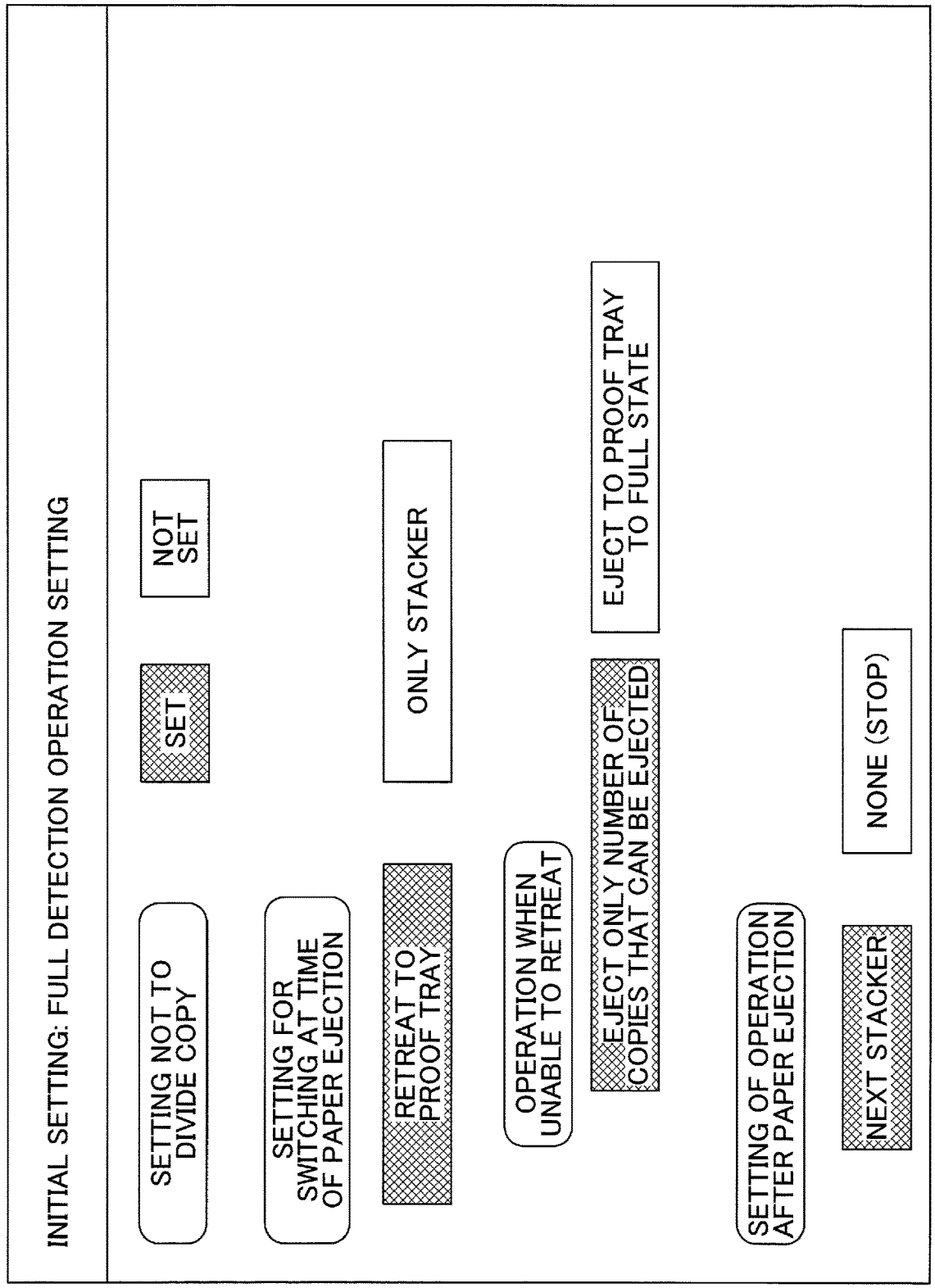

PRINTING SYSTEM AND PRINTING METHOD

CROSS-REFERENCE TO RELATED APPLICATION

The present application is based on and claims priority under 35 U.S.C. § 119 to Japanese Patent Application No. 2018-032492, filed on Feb. 26, 2018, the contents of which are incorporated herein by reference in their entirety.

BACKGROUND OF THE INVENTION

1. Field of the Invention

The present invention relates to a printing system and a printing method.

2. Description of the Related Art

In a printing system capable of accumulating a printed material including a large number of paper sheets, in a stacker that is a paper eject destination of an image forming apparatus, there is a mechanism in which a plurality of stackers are connected with each other, so that the paper eject destination can be automatically switched to another stacker when a stacker becomes full. There is a known technique for estimating the number of copies in advance, and switching the paper eject destination to another stacker or stopping the paper ejection when a stacker becomes full, so that the paper eject destination is not switched in the middle of a copy (for example, Patent Document 1).

Patent Document 1: Japanese Unexamined Patent Application Publication No. 2016-033624

SUMMARY OF THE INVENTION

An aspect of the present invention provides a printing system and a printing method in which one or more of the disadvantages of the related art are reduced.

According to one aspect of the present invention, there is provided a printing system for executing a print job by printing a plurality of copies of a document including a plurality of paper sheets, the printing system including a first paper eject tray and a second paper eject tray to which paper sheets are ejected after the first paper eject tray, the second paper eject tray being a tray to which a smaller number of paper sheets can be ejected compared to the first paper eject tray, the printing system including a hardware processor configured to eject the plurality of paper sheets of the document to the first paper eject tray or the second paper eject tray when printing the document; detect a full state or a near full state based on a number of paper sheets ejected to the first paper eject tray, the near full state being a predetermined number of paper sheets less than the full state; and determine whether a total ejectable paper sheet number is greater than or equal to a number of paper sheets of a next copy of the document, in response to detecting the near full state while printing the plurality of copies of the document, the total ejectable paper sheet number being obtained by adding together a number of paper sheets that can be ejected to the first paper eject tray and a number of paper sheets that can be ejected to the second paper eject tray when the near full state is detected, and eject the paper sheets of the next copy to the first paper eject tray until the first paper eject tray is full and subsequently to the second paper eject tray, in response to detecting that the total ejectable paper sheet number is greater than or equal to the number of paper sheets of the next copy.

BRIEF DESCRIPTION OF THE DRAWINGS

FIG. 14 is a diagram for describing a setting screen of a paper eject destination changing process according to the embodiment of the present invention.

DETAILED DESCRIPTION OF THE PREFERRED EMBODIMENTS

In the technique of the related art for switching the paper eject destination that is the stacker, there is a printing apparatus that ejects printed materials to paper eject destinations separated into a stack part and a sample tray part having a smaller stacking capacity than that of the stack part. This printing apparatus can periodically detect the stack height of printed materials ejected to the stack part, correct the number of copies that can be stacked on the stack part, and switch the paper eject destination between the stack part and the sample tray part. However, the problem is that as the number of paper sheets set per copy increases in the printing operation, the sample tray is not used and the printed materials are ejected to another stack part. For example, in a state where it is estimated that 900 paper sheets can be ejected to the stacker, when a job of 901 paper sheets per copy is executed, the paper eject destination is switched to another stacker. That is, in a state in which a large capacity of the stacker is remaining, the paper eject destination is switched to another stacker in some cases.

A problem to be solved by an embodiment of the present invention is to enable a whole single copy to be collectively ejected without wasting the stacker capacity, by detecting the state of paper sheets stacked on the paper eject tray, when printing a copy including a plurality of paper sheets.

Embodiments of the present invention will be described below with reference to the drawings.

Figure 1:
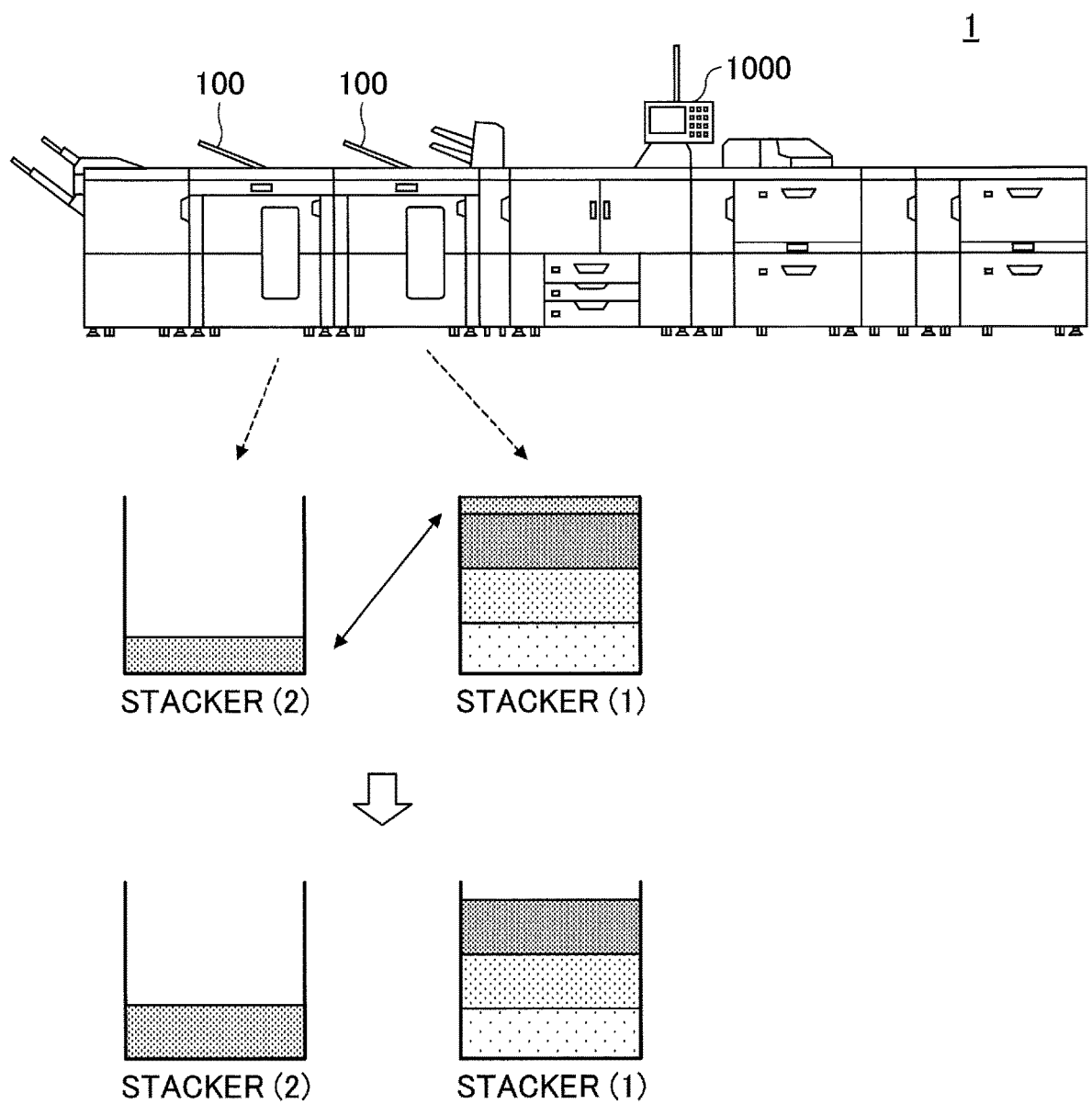
FIG. 1 is a diagram for describing Example (1) of changing the paper eject destination.

FIG. 1 is a diagram for describing Example (1) of changing the paper eject destination. As illustrated in FIG. 1, a printing system 1 includes an image forming apparatus 1000 and two stackers 100 (a stacker (1) and a stacker (2)). When the stacker (1) becomes full in the middle of ejecting paper sheets of a copy, the remaining paper sheets of the copy are ejected to the lowermost layer of the stacker (2), such that one copy is divided, and, therefore, labor has been required for the user to take out the paper sheets in units of copies.

Therefore, before the stacker (1) becomes full, the printing system 1 detects in advance that the stacker (1) will become full in the middle of a copy, and switches the paper eject destination to another stacker (2) before the paper sheets of the copy are ejected, so as to prevent a single copy from being divided and ejected to a plurality of stackers.

Figure 2:
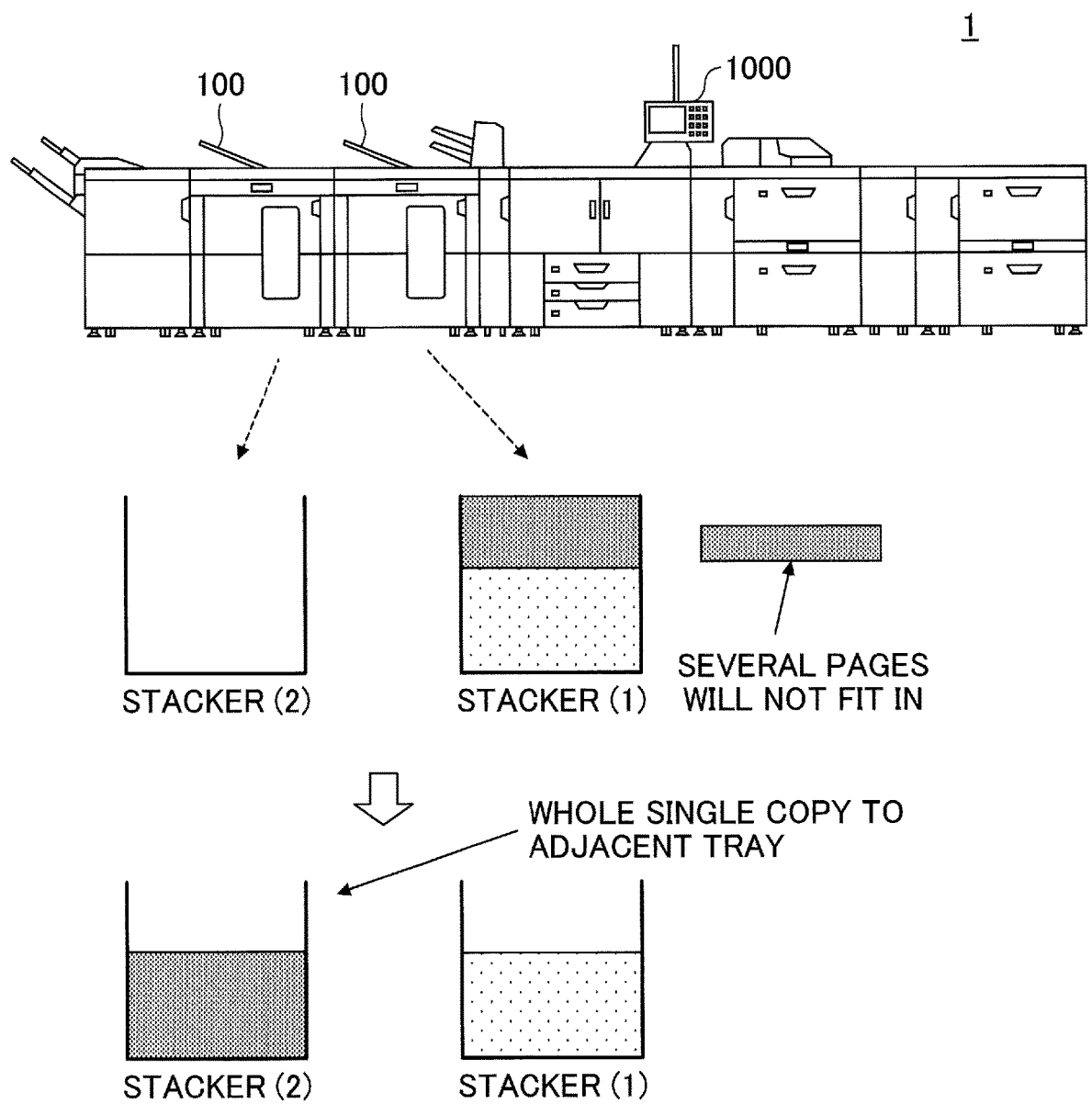
FIG. 2 is a diagram for describing Example (2) of changing the paper eject destination.

FIG. 2 is a diagram for describing Example (2) of changing the paper eject destination. As illustrated in FIG. 2, when even one more paper sheet cannot fit in the stacker, the printing system 1 detects that the stacker (1) will be full, and ejects the whole copy to another stacker. For example, even when there is enough space for 999 paper sheets to fit in the stacker (1), if a copy includes 1000 paper sheets, the whole copy is ejected to the stacker (2). That is, in the printing system 1, it is detected that the stacker is full, in a state where there is actually free space in the stackable portion of the stacker, and, therefore, the number of times the user takes out the printed material increases, and the working efficiency decreases. In particular, in the case of ejecting a plurality of copies on a page-by-page basis, as the number of copies increases, the number of paper sheets of each section increases, so that a large space of the stackable portion of the stacker is not used in some cases.

Figure 3:
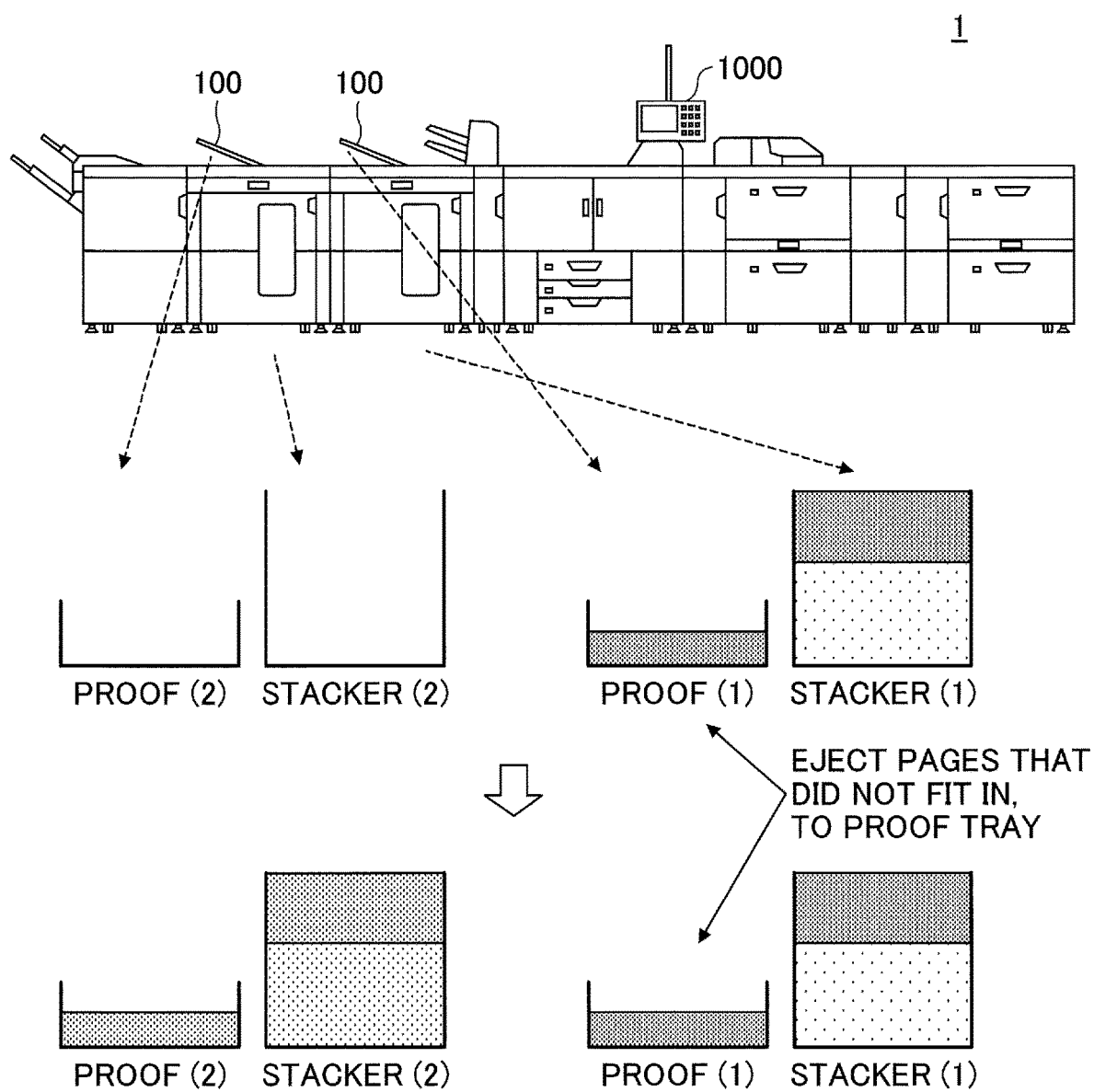
FIG. 3 is a diagram for describing an example of changing the paper eject destination according to an embodiment of the present invention.

FIG. 3 is a diagram for describing an example of changing the paper eject destination according to an embodiment of the present invention. The printing system 1 according to the embodiment of the present invention detects that the stacker will become full in the middle of a copy, and switches the paper eject destination of the paper sheets of the target copy that will not fit in the stacker (1). At this time, when the printing system 1 determines that the whole copy can be ejected to the stacker (1) and a proof tray, based on the stackable number of paper sheets of the stacker (1) and the stackable number of paper sheets of the proof tray, the printing system 1 ejects the paper sheets to the stacker (1) until the stacker (1) becomes full, and ejects the remaining paper sheets of the copy to the proof tray. Subsequently, when ejecting the next copy, the printing system 1 switches the paper eject destination to the stacker 2.

Figure 4:
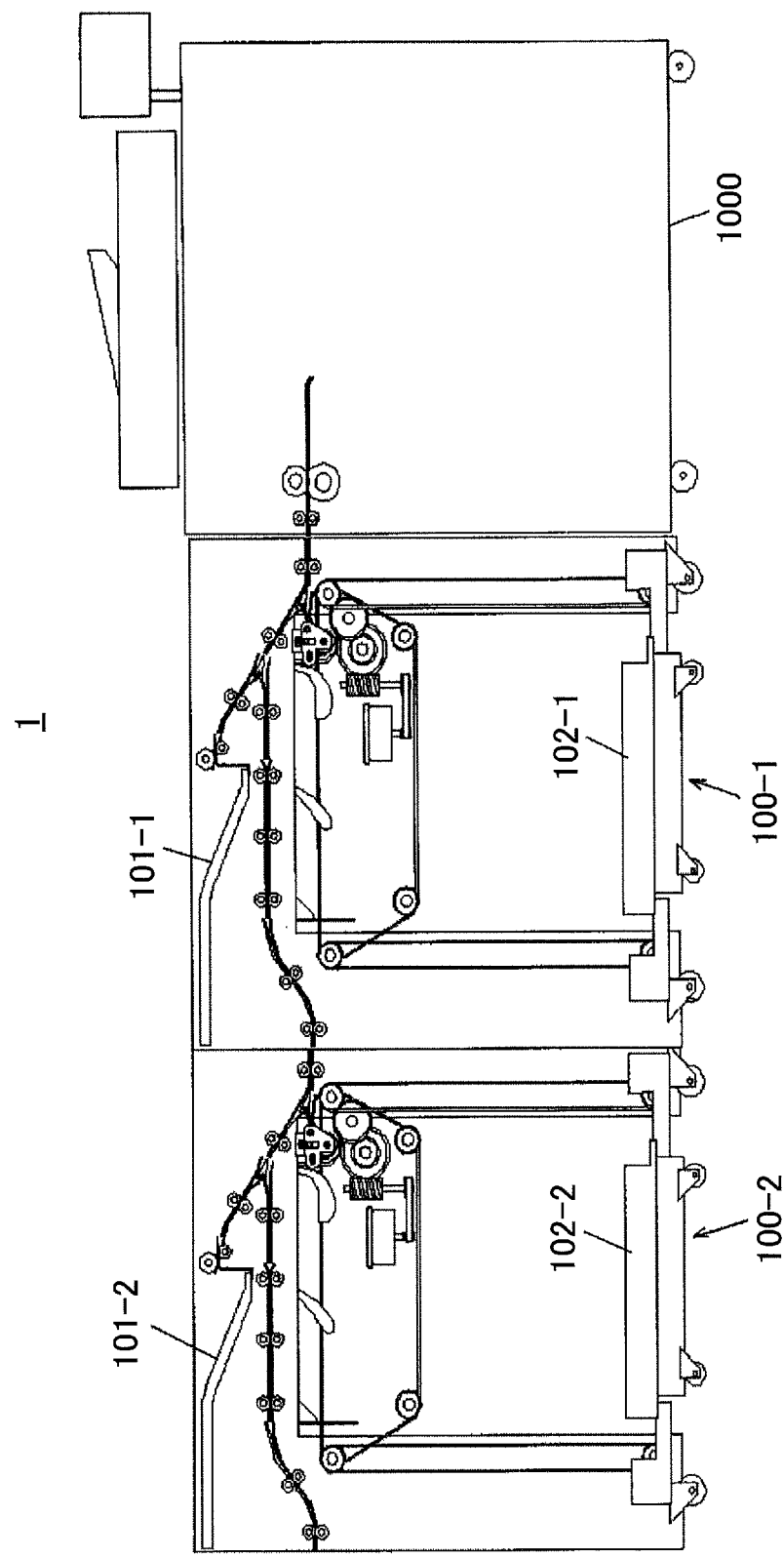
FIG. 4 is a diagram illustrating a configuration example of a printing system 1 according to an embodiment of the present invention.

FIG. 4 is a diagram illustrating a configuration example of the printing system 1 according to the embodiment of the present invention. As illustrated in FIG. 4, the printing system 1 includes the image forming apparatus 1000, the stacker 100-1, and the stacker 100-2. The inlet portion of the first stacker 100-1 is connected to the paper eject portion of the image forming apparatus 1000, and the inlet portion of the second stacker 100-2 is connected to the paper eject portion of the stacker 100-1. A paper sheet ejected from the image forming apparatus 1000 is conveyed to a shift tray 102-1 or a proof tray 101-1 of the stacker 100-1, or to a shift tray 102-2 or a proof tray 101-2 of the stacker 100-2, by a paper sheet conveying path formed by the above connections. Hereinafter, when the stacker 100-1 and the stacker 100-2 are not distinguished from each other, each of these is referred to as the stacker 100. Similarly, when the shift tray 102-1 and the shift tray 102-2 are not distinguished from each other, each of these is referred to as the shift tray 102. Similarly, when the proof tray 101-1 and the proof tray 101-2 are not distinguished from each other, each of these is referred to as the proof tray 101.

Figure 5:
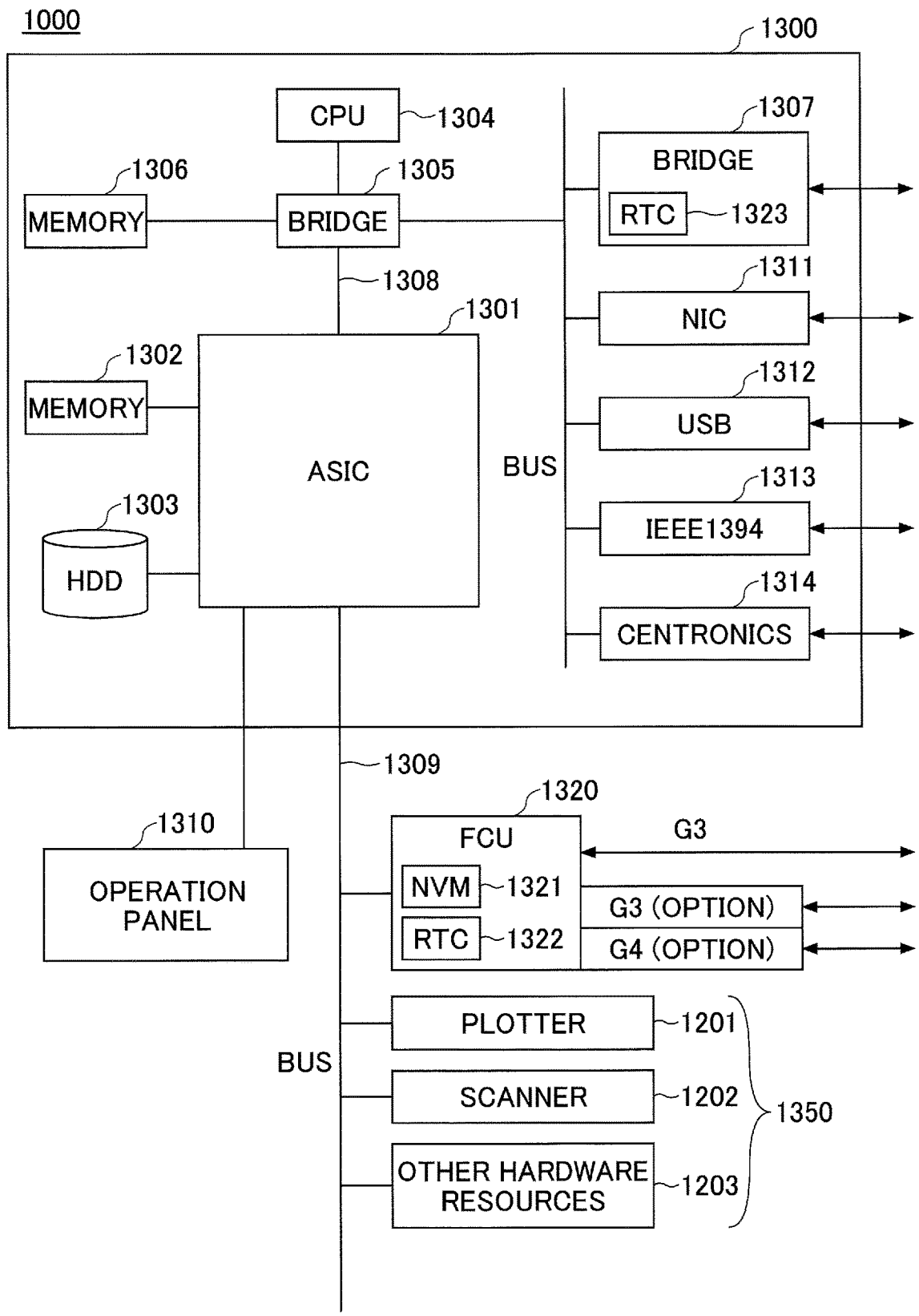
FIG. 5 is a diagram illustrating an example of a hardware configuration of an image forming apparatus 1000 according to an embodiment of the present invention.

FIG. 5 is a diagram illustrating a hardware configuration example of the image forming apparatus 1000 according to the embodiment of the present invention. As illustrated in FIG. 5, the image forming apparatus 1000 includes a controller 1300, a bus 1309, an operation panel 1310, a fax control unit (FCU) 1320, and an engine 1350. The controller 1300 includes an Application Specific Integrated Circuit (ASIC) 1301, a memory 1302, a Hard Disk Drive (HDD) 1303, a Central Processing Unit (CPU) 1304, a bridge 1305, a memory 1306, a bridge 1307, a bus 1308, a Network Interface Card (NIC) 1311, a Universal Serial Bus (USB) 1312, an IEEE 1394 1313, a centronics 1314, and a Real Time Clock (RTC) 1323. The FCU 1320 includes a Non-Volatile Memory (NVM) 1321 and an RTC 1322. The engine 1350 includes a plotter 1201, a scanner 1202, and other hardware resources 1203. The image forming apparatus 1000 includes a hardware configuration in which the operation panel 1310, the FCU 1320, and the engine 1350 are connected to the ASIC 1301 of the controller 1300 via the bus 1309.

The CPU 1304 of the controller 1300 includes a processor and peripheral circuits, and controls the entire printing system 1. The memory 1306 is a storage device used as a work area when a program executed by the CPU 1304 implements control. The HDD 1303 is an auxiliary storage device that stores programs executed by the CPU 1304 and data to be used. The HDD 1303 may be, for example, a hard disk drive or a storage device configured with a flash memory. The NIC 1311, the USB 1312, the IEEE 1394 1313, and the centronics 1314 are various interfaces.

The operation panel 1310 is, for example, a device in which a display device and an input device are integrated, such as a touch panel. The input device is a device for a user or an administrator to perform various input operations. A mouse or a keyboard, etc., other than the touch panel, may be used for the input operation by the user. Furthermore, the operation panel 1310 displays various kinds of information to the user.

The engine 1350 is a hardware element that is connected to the controller 1300 via the bus 1309, and that is controlled by the controller 1300 to operate the plotter 1201 and the scanner 1202 to execute printing or scanning, and eject paper sheets.

Figure 6:
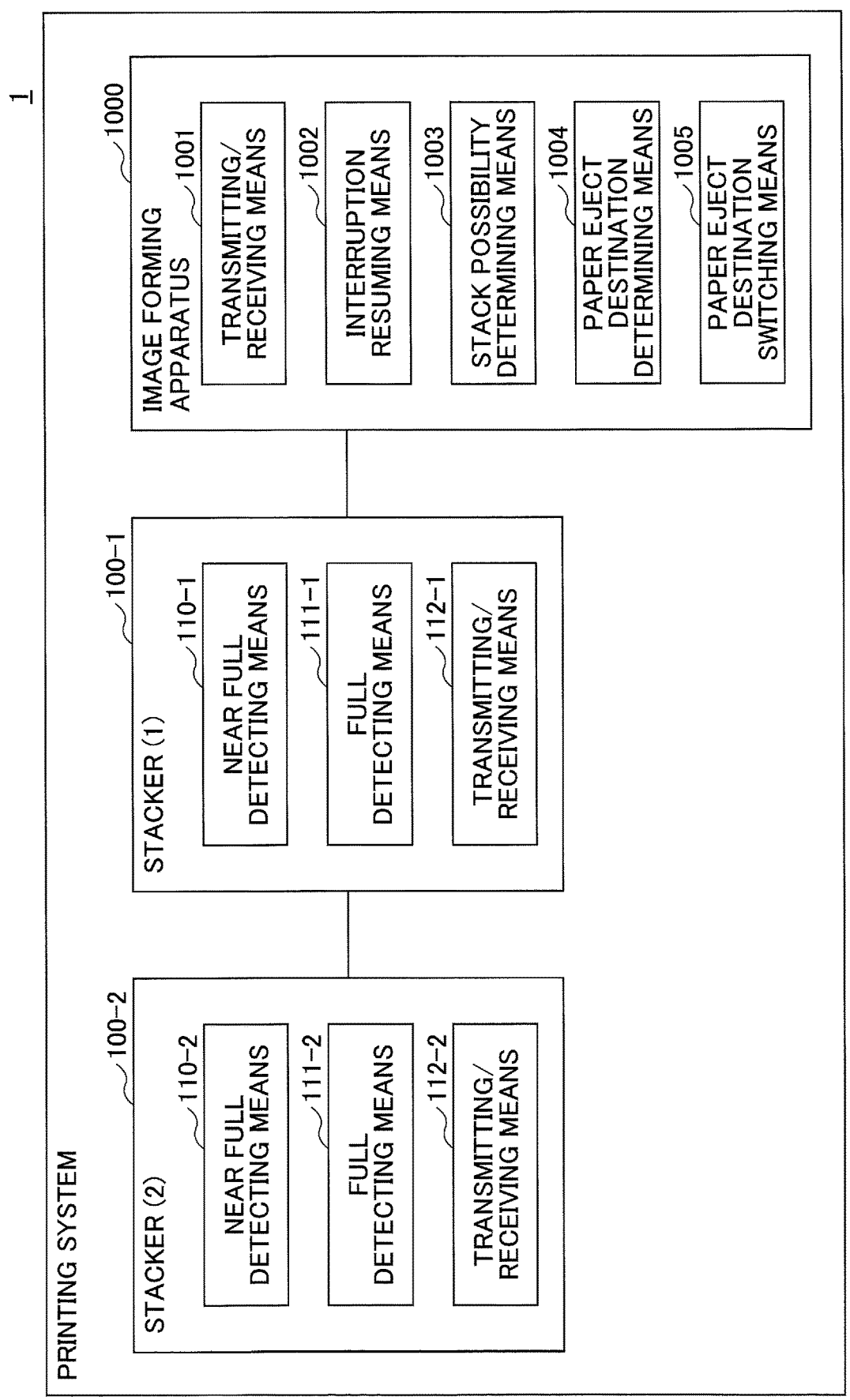
FIG. 6 is a diagram illustrating a functional configuration example (1) of the printing system 1 according to an embodiment of the present invention.

FIG. 6 is a diagram illustrating a functional configuration example (1) of the printing system 1 according to the embodiment of the present invention. The image forming apparatus 1000 included in the printing system 1 includes a transmitting/receiving means 1001, an interruption resuming means 1002, a stack possibility determining means 1003, a paper eject destination determining means 1004, and a paper eject destination switching means 1005, such that when outputting the printed paper sheets to each stacker 100, the paper eject destination can be switched according to the stacked state of the stacker 100.

The transmitting/receiving means 1001 receives a report of detection of a near full state and a full state transmitted from the stacker 100, and transmits a switching request for switching the paper eject destination. "Near full" means a state in which there are less stacked paper sheets than the full state by a predetermined number of paper sheets. The interruption resuming means 1002 determines whether to interrupt or resume paper ejection to the stacker 100. The stack possibility determining means 1003 determines whether paper sheets can be ejected to the respective paper eject destinations attached to the stacker 100, that is, the shift tray 102 and the proof tray 101. The paper eject destination determining means 1004 determines the paper eject destination to which the paper sheets are to be ejected by the image forming apparatus 1000. The paper eject destination switching means 1005 can switch the paper eject destination from the tray to which paper sheets are presently being ejected, to another tray.

Furthermore, the stacker 100-1 or the stacker 100-2 included in the printing system 1, includes the shift tray 102 and the proof tray 101, on which a large amount of paper sheets ejected from the image forming apparatus 1000, can be stacked. The stacker 100 includes a near full detecting means 110-1 or 110-2, a full detecting means 111-1 or 111-2, and a transmitting/receiving means 112-1 or 112-2, such that when it is detected that the stacked state of paper sheets on the tray has reached full or near full, the detection result can be reported to the image forming apparatus 1000. Hereinafter, when the near full detecting units 110-1 and 110-2 are not distinguished from each other, each of these is referred to as the near full detecting means 110. Similarly, when the full detecting means 111-1 and 111-2 are not distinguished from each other, each of these is referred to as the full detecting means 111. Similarly, when the transmitting/receiving means 112-1 and 112-2 are not distinguished from each other, each of these is referred to as the transmitting/receiving means 112.

The near full detecting means 110 detects that each tray of the stacker 100, that is, the shift tray 102 or the proof tray 101, has reached a near full state. The full detecting means 111 detects that each tray of the stacker 100, that is, the shift tray 102 or the proof tray 101, has reached a full state. The transmitting/receiving means 112 reports the near full or full state detected at the stacker 100, to the image forming apparatus 1000.

Figure 7:
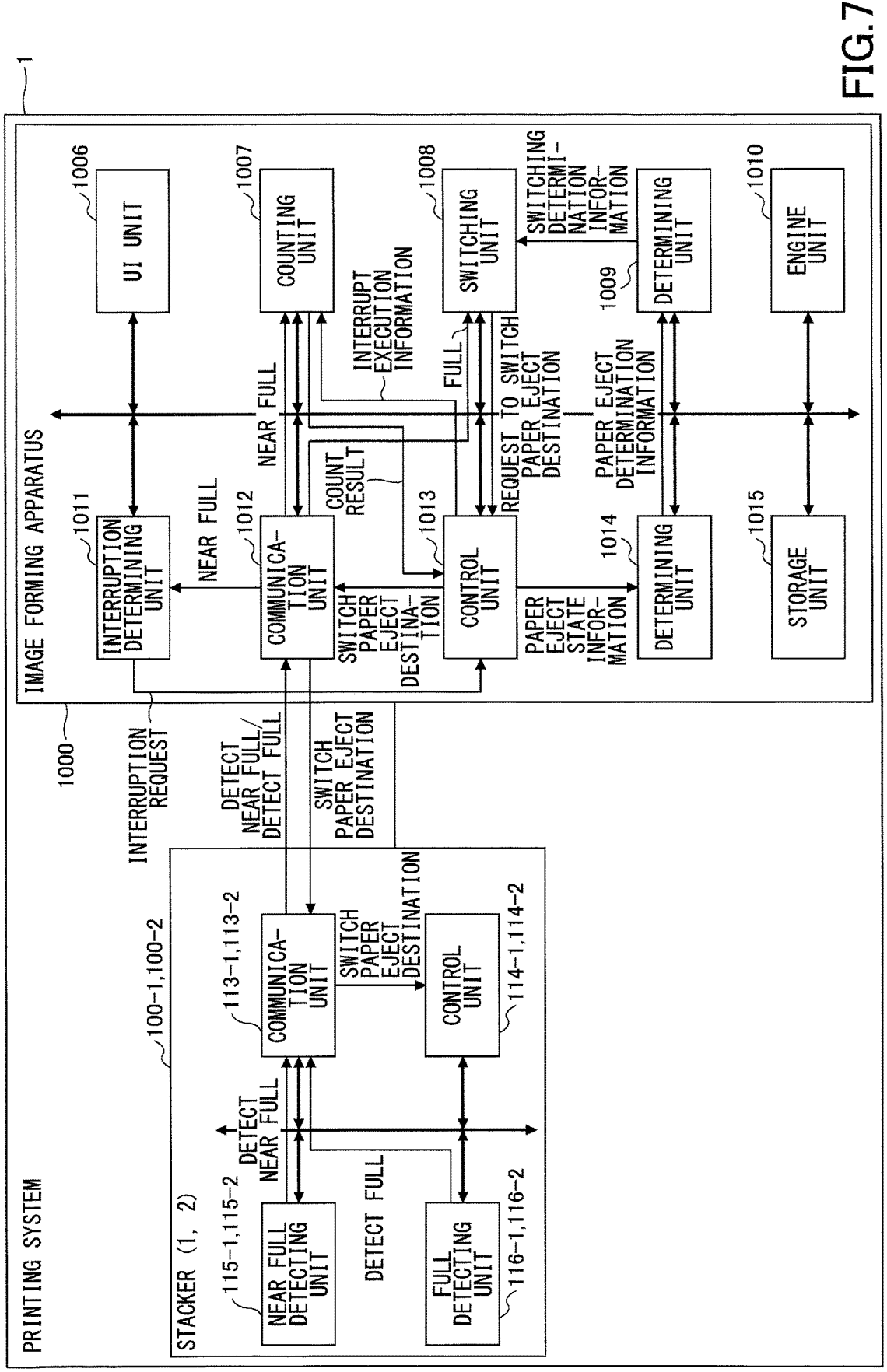
FIG. 7 is a diagram illustrating a functional configuration example (2) of the printing system 1 according to an embodiment of the present invention.

FIG. 7 is a diagram illustrating a functional configuration example (2) of the printing system 1 according to the embodiment of the present invention. In FIG. 7, a detailed functional configuration example of the printing system 1 will be described. The image forming apparatus 1000 includes a user interface (UI) unit 1006, a counting unit 1007, a switching unit 1008, a determining unit 1009, an engine unit 1010, an interruption determining unit 1011, a communication unit 1012, a control unit 1013, a determining unit 1014, and a storage unit 1015. The stacker 100-1 or 100-2 includes a communication unit 113-1 or 113-2, a control unit 114-1 or 114-2, a near full detecting unit 115-1 or 115-2, and a full detecting unit 116-1 or 116-2. Hereinafter, when the communication units 113-1 and 113-2 are not distinguished from each other, each of these is referred to as the communication unit 113. Similarly, when the control units 114-1 and 114-2 are not distinguished from each other, each of these is referred to as the control unit 114. Similarly, when the near full detecting units 115-1 and 115-2 are not distinguished from each other, each of these is referred to as the near full detecting unit 115. Similarly, when the full detecting units 116-1 and 116-2 are not distinguished from each other, each of these is referred to as the full detecting unit 116.

Here, the transmitting/receiving means 1001 illustrated in FIG. 6 corresponds to the communication unit 1012. The interruption resuming means 1002 illustrated in FIG. 6 corresponds to the interruption determining unit 1011 and the control unit 1013. The stack possibility determining means 1003 illustrated in FIG. 6 corresponds to the interruption determining unit 1011 and the determining unit 1014. The paper eject destination determining means 1004 illustrated in FIG. 6 corresponds to the determining unit 1009. The paper eject destination switching means 1005 illustrated in FIG. 6 corresponds to the switching unit 1008. The near full detecting means 110 illustrated in FIG. 6 corresponds to the near full detecting unit 115. The full detecting means 111 illustrated in FIG. 6 corresponds to the full detecting unit 116. The transmitting/receiving means 112 illustrated in FIG. 6 corresponds to the communication unit 113.

The UI unit 1006 displays the display data from the control unit 1013 on a display device such as a display. Furthermore, the UI unit 1006 implements a user interface function of acquiring input from the user to the image forming apparatus 1000 and reporting the input to the control unit 1013.

The engine unit 1010 implements various functions of the image forming apparatus 1000. The various functions are, for example, functions of a printer and a scanner, etc.

The storage unit 1015 is formed of a non-volatile memory, and is controlled by the control unit 1013 to store or read out image data, etc., necessary for the operation of the image forming apparatus 1000.

The communication unit 1012 transmits, to the stacker 100, a paper eject destination switch report indicating to switch the paper eject destination, reported from the control unit 1013. Furthermore, the communication unit 1012 reports, to the interruption determining unit 1011 and the counting unit 1007, the near full detection reported from the stacker 100. Furthermore, the communication unit 1012 reports, to the switching unit 1008, the full detection reported from the stacker.

The counting unit 1007 counts the number of ejected paper sheets, after near full is detected, upon being triggered by the near full report from the communication unit 1012. Furthermore, the count result is reported to the control unit 1013 when the interruption execution information is reported from the control unit 1013.

Upon being triggered by the near full report from the communication unit 1012, the interruption determining unit 1011 determines whether to interrupt the paper ejection based on the remaining number of paper sheets to be ejected and the remaining number of stackable paper sheets at the time of the near full state. When the interruption determining unit 1011 determines that the paper ejection is to be interrupted, the interruption determining unit 1011 reports an interruption request to the control unit 1013.

The control unit 1013 controls the feeding and ejecting of paper sheets. The control unit 1013 reports, to the communication unit 1012, a paper eject destination switch report in order to execute switching of the paper eject destination, in response to a paper eject destination switching request reported from the switching unit 1008. Furthermore, the control unit 1013 interrupts the paper ejection and reports paper eject state information to the determining unit 1014, upon being triggered by the interruption request reported from the interruption determining unit 1011.

The determining unit 1014 calculates the remaining number of stackable paper sheets in the stacker 100, based on the paper eject state information reported from the control unit 1013, and determines how many copies of the presently executed job can be output. Furthermore, the determining unit 1014 determines whether the remaining paper sheets of a copy, for which it has been determined that a full state will be reached in the middle of ejecting the copy, can be ejected to the proof tray 101. The determination result is reported to the determining unit 1009 as paper eject determination information.

The determining unit 1009 determines the paper eject tray switching timing and the switching destination paper eject tray, based on the paper eject determination information reported from the determining unit 1014. The determined information is reported to the switching unit 1008 as switching determination information.

The switching unit 1008 makes a paper eject destination switching request to the control unit 1013, based on the switching determination information reported from the determining unit 1009 and the full detection reported from the communication unit 1012.

The communication unit 113 of the stacker 100 reports, to the image forming apparatus 1000, the near full detection reported from the near full detecting unit 115 and the full detection reported from the full detecting unit 116. Furthermore, the communication unit 113 reports, to the control unit 114, the paper eject destination switch report from the image forming apparatus 1000.

The control unit 114 implements paper eject control, and switches the paper eject destination to the shift tray 102 or the proof tray 101, based on the paper eject destination switch report from the communication unit 113.

When the shift tray 102 is near full, the near full detecting unit 115 reports the near full detection to the communication unit 113. Furthermore, when the proof tray 101 is near full, the near full detecting unit 115 may report the near full detection to the communication unit 113.

When the shift tray 102 becomes full, the full detecting unit 116 reports the full detection to the communication unit 113. Furthermore, when the proof tray 101 becomes full, the full detecting unit 116 may report the full detection to the communication unit 113.

Figure 8:
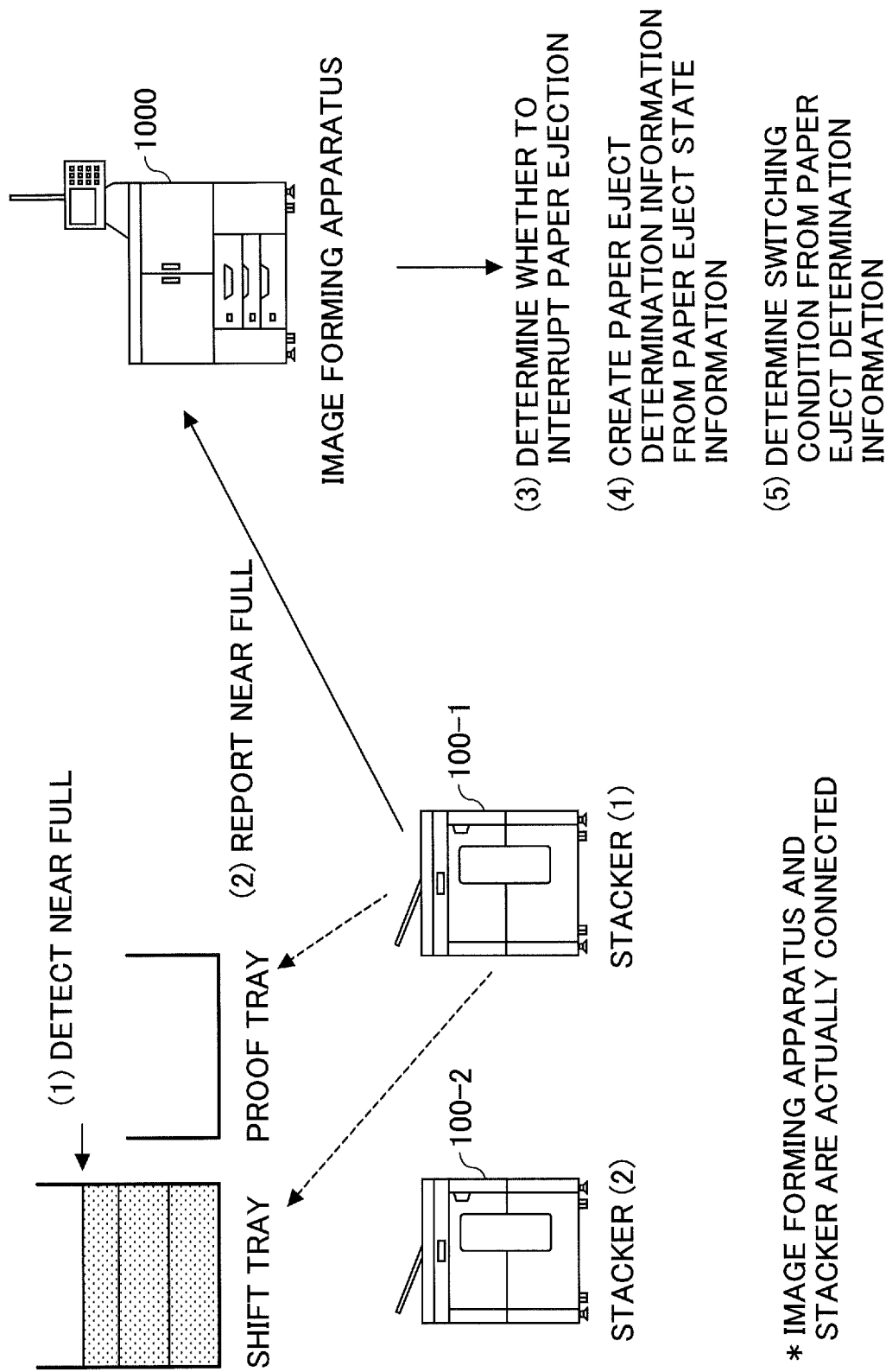
FIG. 8 is a diagram for describing Example (1) of a paper eject destination changing process according to the embodiment of the present invention.

FIG. 8 is a diagram for describing Example (1) of the paper eject destination changing process according to the embodiment of the present invention. In FIG. 8, an example of a paper eject destination changing process when the shift tray 102-1 of the stacker 100-1 detects near full, will be described.

When near full of the shift tray 102-1 is detected while the image forming apparatus 1000 is ejecting paper sheets to the stacker 100-1, the stacker 100-1 reports near full to the image forming apparatus 1000. The near full state is a state before the tray becomes full, and the near full state is detected when a predetermined number of paper sheets is reached or when output of the sensor for detecting a predetermined paper sheet stack amount is confirmed.

Upon receiving the near full detection report, the image forming apparatus 1000 compares the remaining number of paper sheets that can be ejected to the shift tray 102-1 to which paper sheets are presently being ejected, with the remaining number of paper sheets of the copy being printed that need to be ejected. When there are more remaining paper sheets that need to be ejected, than the number of paper sheets that can be ejected to the shift tray 102-1; that is, when all paper sheets of the copy cannot be ejected to the shift tray 102-1, the paper eject operation is interrupted.

When the interruption determining unit 1011 determines to interrupt the paper eject operation, the control unit 1013 interrupts the paper ejecting, and subsequently, the determining unit 1014 acquires paper eject state information from the control unit 1013, and generates paper eject determination information. The determining unit 1009 determines the switching condition based on the paper eject determination information, and the determined information is stored in the storage unit 1015. When it is determined that the paper sheets can be ejected without dividing a copy, the image forming apparatus 1000 resumes the paper ejection, and the paper sheets are ejected to the shift tray 102-1, and subsequently, paper sheets are ejected to the proof tray 101 determined based on the switching condition.

Figure 9:
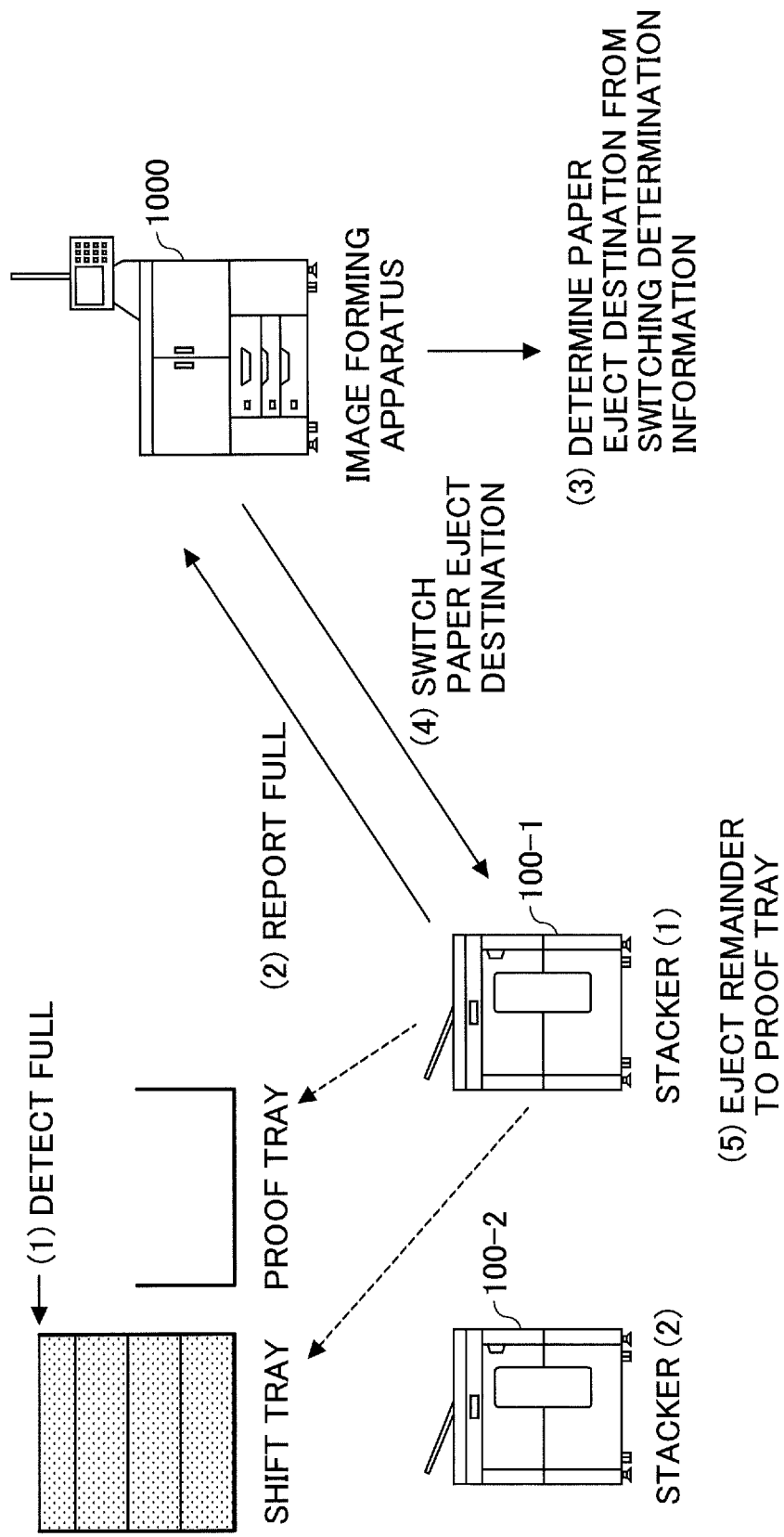
FIG. 9 is a diagram for describing Example (2) of a paper eject destination changing process according to the embodiment of the present invention.

FIG. 9 is a diagram for describing Example (2) of the paper eject destination changing process according to the embodiment of the present invention. In FIG. 9, an example of a paper eject destination changing process when the shift tray 102-1 of the stacker 100-1 detects full, is described.

When the full state of the shift tray 102-1 is detected while the image forming apparatus 1000 is ejecting paper sheets to the stacker 100-1, the stacker 100-1 reports the full detection to the image forming apparatus 1000. Upon receiving the report of the full detection, the image forming apparatus 1000 determines the paper eject tray to which the paper eject destination is to be switched, based on the switching determination information. When the determined paper eject tray is a proof tray, the image forming apparatus 1000 reports to the stacker 100-1 to switch to the proof tray 101-1, and ejects the remaining sheets of the copy to the proof tray 101-1. The switching of the paper eject destination is executed by the switching unit 1008. Note that the image forming apparatus 1000 can display the paper eject destination on the UI unit 1006 at the time of switching.

Figure 10:
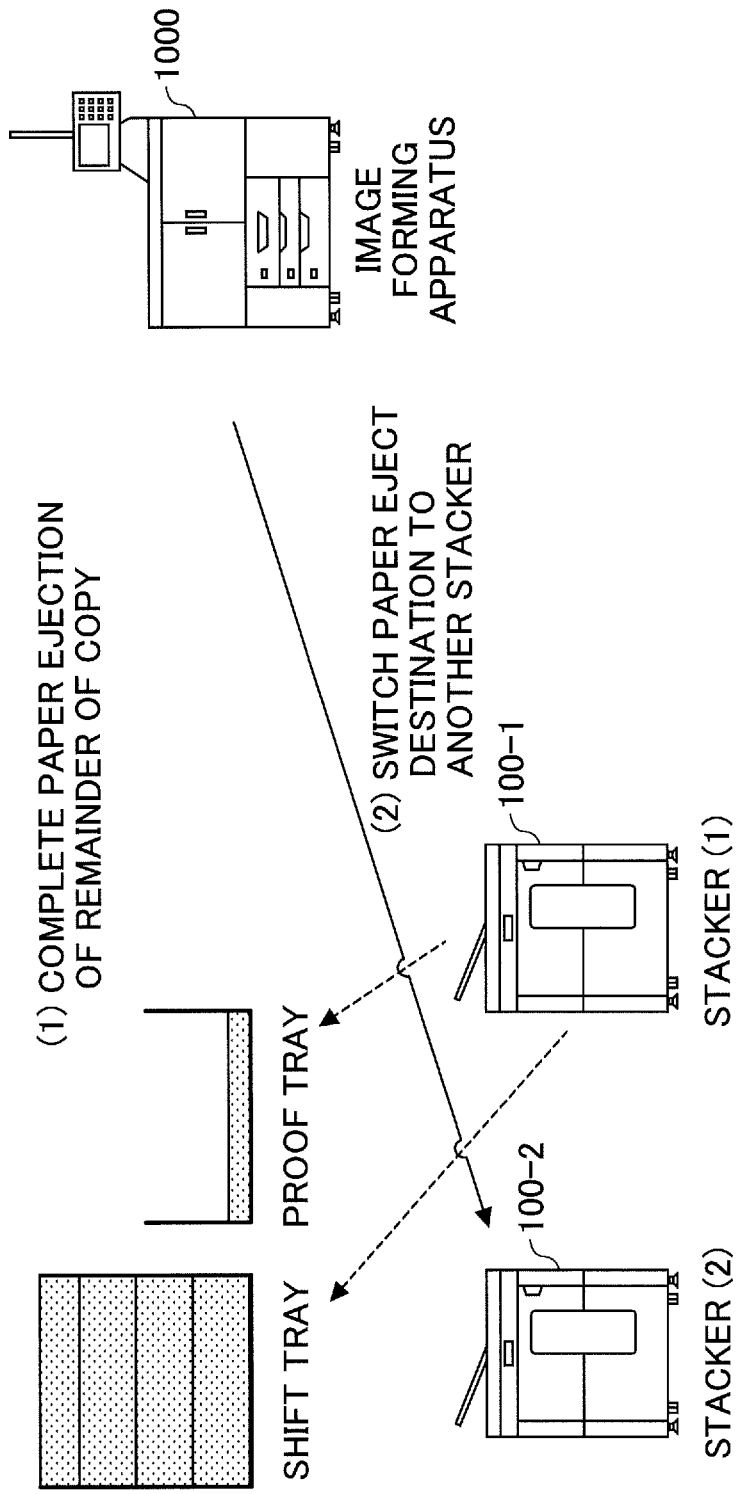
FIG. 10 is a diagram for describing Example (3) of a paper eject destination changing process according to the embodiment of the present invention.

FIG. 10 is a diagram for describing Example (3) of the paper eject destination changing process according to the embodiment of the present invention. In FIG. 10, an example of a paper eject destination changing process at the time of completing the ejection of remaining paper sheets of a copy to the proof tray 101-1 of the stacker 100-1, will be described.

When the image forming apparatus 1000 finishes ejecting the remaining paper sheets of a copy to the proof tray 101-1, the image forming apparatus 1000 ejects the remaining copies that are not yet ejected, to the stacker 100-2. Also in the stacker 100-2, when near full is detected, a process similar to the case of the stacker 100-1 is performed. Note that depending on the setting of the image forming apparatus 1000, it may be possible to wait for a resume operation by the user, without changing the paper eject destination.

Figure 11:
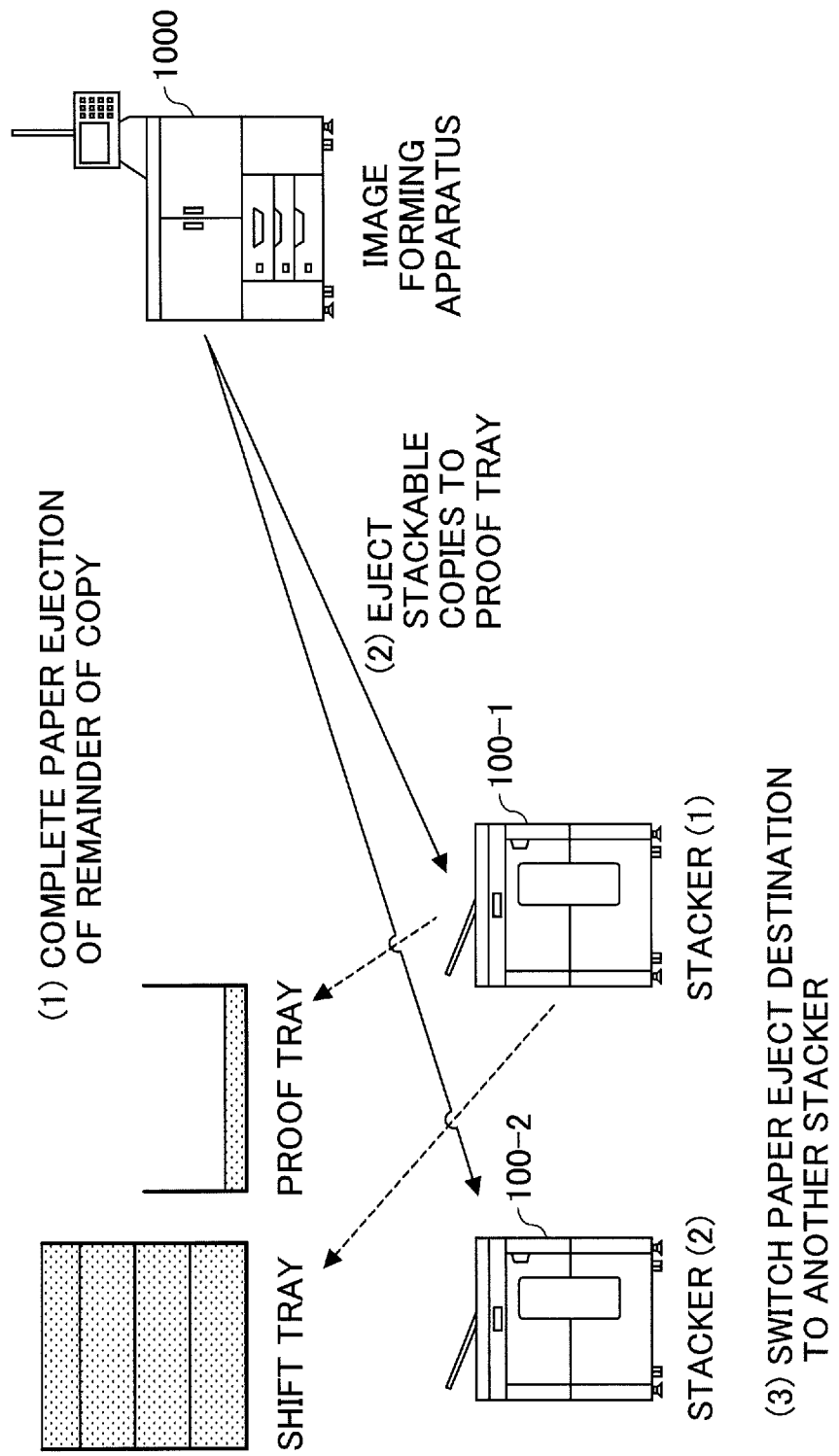
FIG. 11 is a diagram for describing Example (4) of a paper eject destination changing process according to the embodiment of the present invention.

FIG. 11 is a diagram for describing Example (4) of the paper eject destination changing process according to the embodiment of the present invention. In FIG. 11, an example of a paper eject destination changing process at the time of completing the ejection of remaining paper sheets of a copy to the proof tray 101-1 of the stacker 100-1 will be described.

After the image forming apparatus 1000 finishes ejecting the remaining paper sheets of a copy to the proof tray 101-1, the image forming apparatus 1000 can continue to eject paper sheets, if there are copies that can be stacked on the proof tray 101-1. After ejecting a number of copies that can be stacked on the proof tray 101-1, the image forming apparatus 1000 switches the paper eject destination to the stacker 100-2 and continues to eject paper sheets.

That is, the image forming apparatus 1000 detects near full, and while ejecting or after ejecting paper sheets to the proof tray 101-1, the image forming apparatus 1000 determines whether one or more copies can be further ejected to the proof tray 101-1. When paper ejection is possible, paper sheets are continuously ejected to the proof tray 101-1. When paper ejection is impossible, the ejection is interrupted and a warning may be displayed to the user.

Here, a method of detecting the number of paper sheets or the number of copies that can be stacked on the proof tray 101, will be described. The number of paper sheets per copy relating to the print job may be acquired from the UI unit 1006 of the image forming apparatus 1000 or a printer driver, etc., executed by a Personal Computer (PC), etc., connected to the image forming apparatus 1000. Then, by comparing the number of paper sheets per copy with a previously-acquired maximum number of paper sheets that can be stacked on the proof tray 101, it is possible to determine whether there is space for one or more copies on the proof tray 101, with respect to the print job that is the processing target.

Furthermore, as a method of detecting the number of paper sheets or the number of copies that can be stacked on the proof tray 101, this detection may be performed based on the paper weight. A weight sensor is installed in the proof tray 101 to acquire the weight of the paper sheets presently held in the proof tray 101. The difference between the maximum stack weight of the proof tray 101 acquired in advance and the weight of the paper sheets presently held, and the weight of the paper sheets of one copy of the job that is the processing target are compared, to determine whether there is space for one or more copies on the proof tray 101, with respect to the job that is the processing target. The weight of the paper sheets of one copy relating to the job that is the processing target may be acquired by the control unit 1013 by a known configuration or method.

Figure 12:
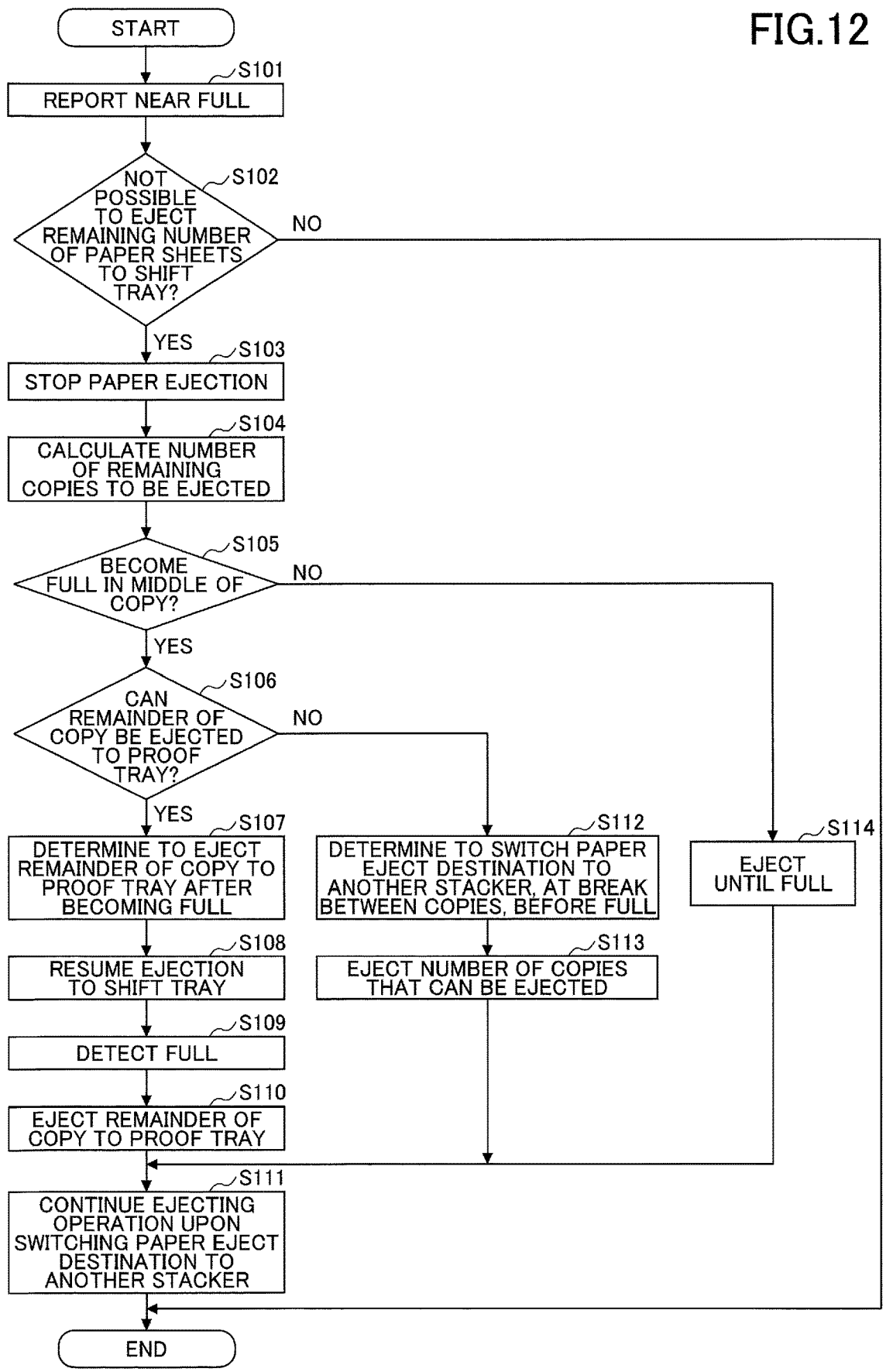
FIG. 12 is a flowchart for describing an example of a paper eject destination changing process according to an embodiment of the present invention.

FIG. 12 is a flowchart for describing an example of the paper eject destination changing process according to the embodiment of the present invention. In FIG. 12, an example of the processing by the printing system 1 after near full is detected by the stacker 100, will be described. When executing a print job that is a processing target for a plurality of paper sheets, the printing system 1 executes printing of one copy or a plurality of copies of a document.

In step S101, the near full detecting unit 115 of the stacker 100 detects that the stacked state of the shift tray 102 is near full and reports this to the image forming apparatus 1000. Subsequently, the determining unit 1014 determines whether it is impossible to eject the remaining number of paper sheets of the copy to the shift tray 102. When paper ejection is impossible (YES in step S102), the process proceeds to step S103, and when paper ejection is possible (NO in step S102), the flow is ended.

In step S103, the control unit 1013 stops ejecting paper sheets to the stacker 100. Subsequently, the determining unit 1014 calculates the number of remaining copies that are to be ejected (step S104). Subsequently, the determining unit 1014 determines whether the shift tray 102 will be full in the middle of a copy. When the shift tray 102 will be full in the middle of a copy (YES in step S105), the process proceeds to step S106. When the shift tray 102 will not be full in the middle of the copy (NO in step S105), the process proceeds to step S114.

In step S106, the determining unit 1009 determines whether the remaining paper sheets of the copy can be ejected to the proof tray after the shift tray 102 is full. When the paper sheets can be ejected to the proof tray (YES in step S106), the process proceeds to step S107. When the paper sheets cannot be ejected to the proof tray (NO in step S106), the process proceeds to step S112.

In step S107, the determining unit 1009 determines to eject the remaining paper sheets of the copy to the proof tray 101, after the shift tray 102 becomes full. Subsequently, the control unit 1013 resumes the paper ejection to the shift tray 102 (step S108). When the detection of full is reported (step S109), the control unit 1013 ejects the remaining paper sheets of the copy to the proof tray 101 (step S110).

In step S111, the control unit 1013 switches the paper eject destination to another stacker and continues the paper eject operation.

In step S112, before the shift tray 102 is full, the determining unit 1009 determines to switch the paper eject destination to another stacker, at a break between copies. Subsequently, the control unit 1013 ejects a number of copies that can be ejected to the shift tray 102 (step S113), and the process proceeds to step S111.

In step S114, the control unit 1013 ejects paper sheets to the shift tray 102 until the shift tray 102 is full, and the process proceeds to step S111.

Figure 13:
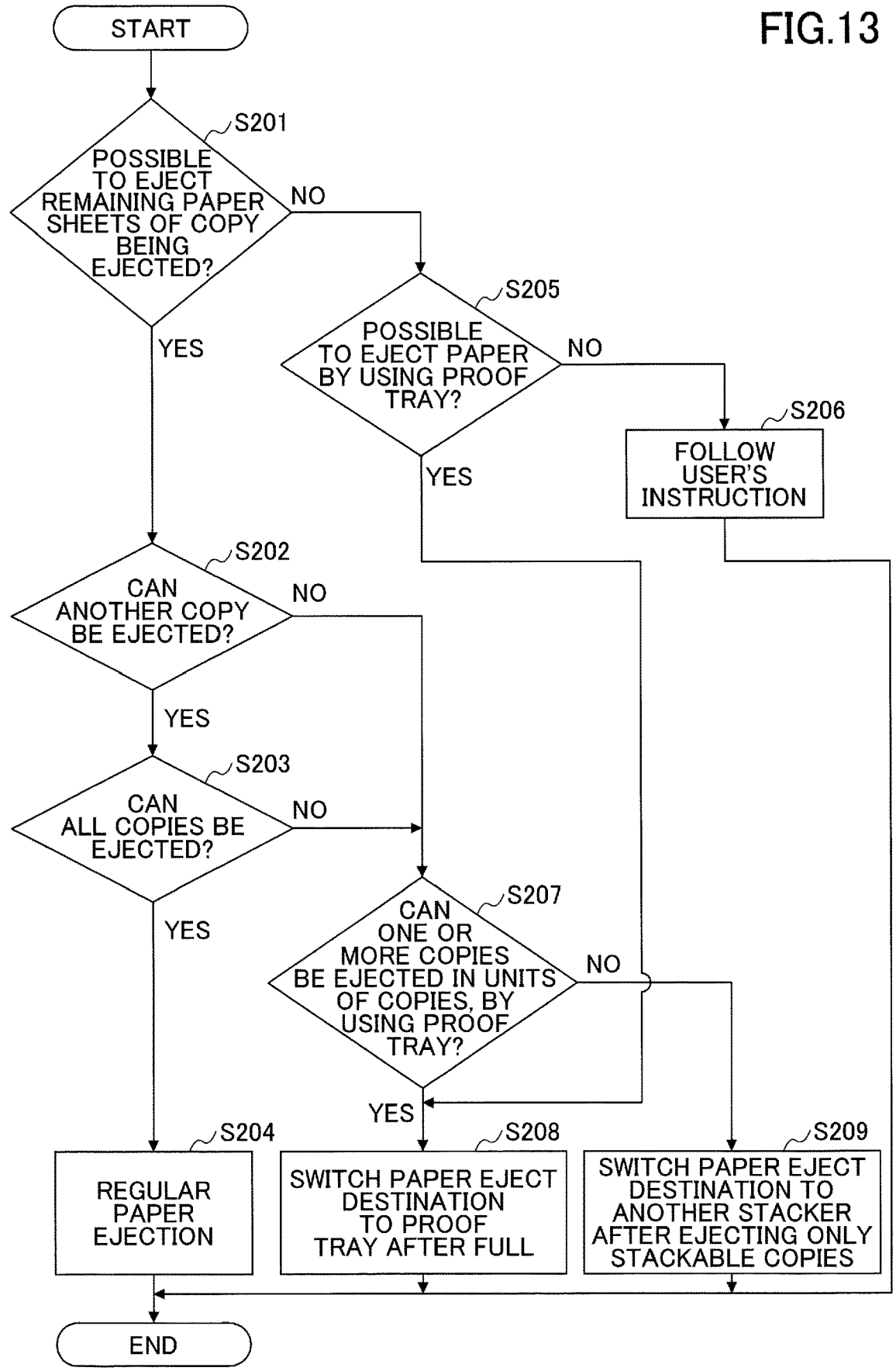
FIG. 13 is a flowchart for describing an example of a paper eject destination changing process relating to a plurality of copies according to the embodiment of the present invention.

FIG. 13 is a flowchart for describing an example of a paper eject destination changing process with respect to a plurality of copies according to the embodiment of the present invention. In FIG. 13, an example of the process of determining the paper eject destination of the printing system 1 after near full is detected by the stacker 100, will be described.

In step S201, the determining unit 1014 determines whether the remaining paper sheets of the copy being ejected, can be ejected to the shift tray 102. When the paper sheets can be ejected (YES in step S201), the process proceeds to step S202. When the paper sheets cannot be ejected (NO in step S201), the process proceeds to step S205.

In step S202, the determining unit 1014 determines whether another copy of the presently executed print job, can be ejected to the shift tray 102. When another copy can also be ejected (YES in step S202), the process proceeds to step S203. When another copy cannot be ejected (NO in step S202), the process proceeds to step S208. This determination is made based on the number of paper sheets that can be ejected to the shift tray 102.

In step S203, the determining unit 1014 determines whether all of the copies can be ejected to the shift tray 102. When all the copies can be ejected (YES in step S203), the process proceeds to step S204. When all of the copies cannot be ejected (NO in step S203), the process proceeds to step S208.

In step S204, the control unit 1013 ejects all copies to the shift tray 102, without switching the paper eject destination.

In step S205, the determining unit 1014 determines whether it is possible to eject the remaining paper sheets of the copy in the middle of being ejected, by using the proof tray 101. When the paper sheets can be ejected (YES in step S205), the process proceeds to step S208. When the paper sheets cannot be ejected (NO in step S205), the process proceeds to step S207.

In step S206, the control unit 1013 follows an instruction input by the user regarding the paper ejecting process, or performs a preset operation, and ends the flow.

In step S207, the determining unit 1014 determines whether or one or more copies can be ejected in units of copies, when the proof tray 101 is used. When one or more copies can be ejected in units of copies (YES in step S207), the process proceeds to step S208. When one or more copies cannot be ejected in units of copies (NO in step S207), the process proceeds to step S209. This determination is made based on a number of paper sheets that can be ejected, obtained by adding together the number of paper sheets that can be ejected to the shift tray 102 and the number of paper sheets that can be ejected to the proof tray 101.

In step S208, the control unit 1013 ejects the remaining paper sheets of the copy that is in the middle of being ejected until the shift tray 102 becomes full, and then switches the paper eject destination to the proof tray 101, and finishes ejecting the remaining paper sheets of the copy that is in the middle of being ejected, and all other copies that can be ejected, and ends the flow.

In step S209, the control unit 1013 ejects only the copies that can be stacked to the shift tray 102, and then switches the paper eject destination to another stacker 100.

The details of the determination relating to the paper eject destination switching in FIG. 12 or FIG. 13 will be described below. Table 1 is an example of paper eject state information.

TABLE 1

| ITEM NAME | VALUE |
|---|---|
| NUMBER OF REMAINING STACKABLE PAPER SHEETS WHEN NEAR FULL | 1000 PAPER SHEETS |
| NUMBER OF REMAINING PAPER SHEETS TO BE EJECTED OF COPY BEING EJECTED | 50 PAPER SHEETS |
| NUMBER OF PAPER SHEETS PER COPY | 150 PAPER SHEETS |
| NUMBER OF REMAINING COPIES | 20 COPIES |
| NUMBER OF PAPER SHEETS THAT CAN BE STACKED ON PROOF TRAY | 200 PAPER SHEETS |

As indicated in Table 1, the items of the paper eject state information are "number of remaining stackable paper sheets when near full", "number of remaining paper sheets to be ejected of copy being ejected", "number of paper sheets per copy", "number of remaining copies", and "number of paper sheets that can be stacked on proof tray". The paper eject state information is used when the determining unit 1014 generates paper eject determination information for determining a paper eject destination switching condition when near full of the shift tray 102 is detected. The paper eject determination information may be managed by the control unit 1013.

The "number of remaining stackable paper sheets when near full" is the number of remaining paper sheets that can be ejected to the shift tray 102 of the stacker 100 that detected near full. Depending on the type of paper such as plain paper or thick paper, the number of paper sheets varies.

A number of remaining paper sheets obtained by excluding, from the "number of remaining stackable paper sheets when near full", the paper sheets ejected from when near full is reported until paper ejection is interrupted, counted by the counting section 1007, is used by the determining unit 1009 when determining the paper eject destination switching condition.

"Number of remaining paper sheets to be ejected of copy being ejected" is the number of remaining paper sheets to be ejected of a copy that is in the middle of being ejected, when near full is reported. For example, when one copy is 150 paper sheets, and the report is received in a state where 100 paper sheets have been ejected, the "number of remaining paper sheets to be ejected of copy being ejected" will be 50 paper sheets. Furthermore, for example, when there is no copy that is in the middle of being ejected, the "number of remaining paper sheets to be ejected of copy being ejected" will be zero paper sheets.

"Number of paper sheets per copy" is the number of paper sheets to be printed per copy of the presently executed print job.

"Number of remaining copies" is the number of remaining copies to be ejected, in the presently executed print job. For example, in a state where the print job includes 50 copies, and printing of 29 copies has been completed, and near full is detected while ejecting a copy, the number of remaining copies will be 20 copies.

"Number of paper sheets that can be stacked on proof tray" is the number of paper sheets that can be stacked on the proof tray 101.

Table 2 is an example of paper eject determination information. Table 3 indicates the calculation conditions or methods for calculating paper eject determination information based on paper eject state information.

TABLE 2

| ITEM NAME | VALUE |
|---|---|
| FULL IN MIDDLE OF COPY | YES |
| PROOF TRAY PAPER EJECTION POSSIBILITY | POSSIBLE |
| NUMBER OF STACKABLE COPIES | 6 COPIES |
| NUMBER OF REMAINING PAPER SHEETS IN ONE COPY AT TIME OF FULL EJECTION | 100 PAPER SHEETS |
| REMAINING NUMBER OF STACKABLE PAPER SHEETS | 50 PAPER SHEETS |
| NUMBER OF PAPER SHEETS THAT CAN BE EJECTED TO SHIFT TRAY | 950 PAPER SHEETS |

TABLE 3

| ITEM NAME | VALUE | CALCULATION CONDITION OR METHOD |
|---|---|---|
| FULL IN MIDDLE OF COPY | YES | NUMBER OF STACKABLE COPIES < NUMBER OF REMAINING COPIES AND NUMBER OF REMAINING PAPER SHEETS IN ONE COPY AT TIME OF FULL EJECTION ! = 0 |
| | NO | NUMBER OF STACKABLE COPIES ≥ NUMBER OF REMAINING COPIES NUMBER OF REMAINING PAPER SHEETS IN ONE COPY AT TIME OF FULL EJECTION = 0 |
| PROOF TRAY PAPER EJECTION POSSIBILITY | POSSIBLE | NUMBER OF PAPER SHEETS THAT CAN BE STACKED ON PROOF TRAY − NUMBER OF REMAINING PAPER SHEETS IN ONE COPY AT TIME OF FULL EJECTION ≥ 0 |
| | NOT POSSIBLE | NUMBER OF PAPER SHEETS THAT CAN BE STACKED ON PROOF TRAY − NUMBER OF REMAINING PAPER SHEETS IN ONE COPY AT TIME OF FULL EJECTION < 0 |
| NUMBER OF STACKABLE COPIES | NUMBER OF COPIES | NUMBER OF PAPER SHEETS THAT CAN BE EJECTED TO SHIFT TRAY ÷ NUMBER OF PAPER SHEETS PER COPY (DECIMALS ARE TRUNCATED, 0 WHEN MINUS) |

TABLE 3-continued

| ITEM NAME | VALUE | CALCULATION CONDITION OR METHOD |
|---|---|---|
| NUMBER OF REMAINING PAPER SHEETS IN ONE COPY AT TIME OF FULL EJECTION | NUMBER OF PAPER SHEETS | WHEN REMAINING NUMBER OF STACKABLE PAPER SHEETS IS MINUS: − NUMBER OF PAPER SHEETS THAT CAN BE EJECTED TO SHIFT TRAY WHEN REMAINING NUMBER OF STACKABLE PAPER SHEETS IS PLUS: NUMBER OF PAPER SHEETS PER COPY − REMAINING NUMBER OF STACKABLE PAPER SHEETS |
| REMAINING NUMBER OF STACKABLE PAPER SHEETS | NUMBER OF PAPER SHEETS | NUMBER OF PAPER SHEETS THAT CAN BE EJECTED TO SHIFT TRAY − (NUMBER OF STACKABLE COPIES × NUMBER OF PAPER SHEETS PER COPY) |
| NUMBER OF PAPER SHEETS THAT CAN BE EJECTED TO SHIFT TRAY | NUMBER OF PAPER SHEETS | REMAINING NUMBER OF STACKABLE PAPER SHEETS AT TIME OF NEAR FULL − NUMBER OF REMAINING PAPER SHEETS TO BE EJECTED OF COPY THAT IS BEING EJECTED |

The determining unit 1014 generates paper eject determination information as indicated in Table 2, by the calculation condition or method indicated in Table 3 based on the paper eject state information. As indicated in Table 2, the paper eject determination information includes "full in middle of copy", "proof tray paper ejection possibility", "number of stackable copies", "number of remaining paper sheets in one copy at time of full ejection", "remaining number of stackable paper sheets", and "number of paper sheets that can be ejected to shift tray".

"Number of paper sheets that can be ejected to shift tray" refers to the free space of the shift tray in a case of ejecting the remaining number of paper sheets of a copy being ejected, when a near full report is received. This information is mainly used in step S201 indicated in FIG. 13. At the time when a near full report is received, when the number of paper sheets that can be ejected to the shift tray 102 is 1000 paper sheets, and the number of remaining paper sheets to be ejected in a copy that is being ejected is 50 paper sheets, 1000−50=950 paper sheets, and, therefore, the "number of paper sheets that can be ejected to shift tray" is 950 paper sheets.

"Number of stackable copies" is the number of copies that can be ejected to the free space of the shift tray 102. This information is mainly used in step S202 or step S203 indicated in FIG. 13. For example, when the number of paper sheets that can be ejected to the shift tray is 950 paper sheets, and the number of paper sheets per copy is 150 paper sheets, 950÷150=6.333, and, therefore, the "number of stackable copies" becomes 6 copies. Note that in the calculation formula, decimals are truncated.

The "remaining number of stackable paper sheets" is the number of paper sheets that can be ejected when all of the stackable copies have been ejected. This information is mainly used in step S207 indicated in FIG. 13. For example, when the number of paper sheets that can be ejected to the shift tray is 950 paper sheets, the number of stackable copies is 6 copies, and the number of paper sheets per copy is 150, 950−(6×150)=50, and, therefore, the "remaining number of stackable paper sheets" becomes 50 paper sheets.

"Number of remaining paper sheets in one copy at time of full ejection" is the number of remaining paper sheets when the shift tray 102 is full, in a case where the number of stackable copies+1 copy are ejected. That is, the "number of remaining paper sheets in one copy at time of full ejection" is the number of candidate paper sheets to be stacked on the proof tray 101, and this information is used to determine whether paper sheets can be stacked on the proof tray 101. This information is mainly used in steps S205 and S207 indicated in FIG. 13. For example, when the number of paper sheets per copy is 150 paper sheets and the remaining number of stackable paper sheets is 50 paper sheets, then 150−50=100, and, therefore, the "number of remaining paper sheets in one copy at time of full ejection" becomes 100 paper sheets.

"Full in middle of copy" is information indicating whether the shift tray 102 will become full in the middle of a copy, when paper sheets are continuously ejected to the shift tray 102. When ejection of all of the copies of a job is completed before the full state, that is, ejection of the last copy is completed, or the remaining number of paper sheets in one copy can be ejected on the proof tray 101 at the time of full ejection, the value is set as "no". On the other hand, when the remaining paper sheets in the copy are ejected to the proof tray 101, or when a full state is reached in the middle of a copy even when the proof tray 101 is used, the value is set as "yes".

For example, when the number of stackable copies is 6 copies, and the number of remaining copies is 20 copies, 6<20, and when the number of paper sheets that can be stacked on the proof tray is 200 paper sheets, and the number of remaining paper sheets in one copy at the time of full ejection is 100 paper sheets, 200−100=100!=0, and, therefore, the value of "full in middle of copy" becomes "yes". In the case of "no", when either of the conditions indicated in table 3 is satisfied, the value becomes "no".

"Proof tray paper ejection possibility" is information indicating whether paper sheets can be ejected to the proof tray 101 without filling up the proof tray 101, when the remaining paper sheets in the copy are ejected to the proof tray 101 when the shift tray 102 is full. For example, when the number of paper sheets that can be stacked on the proof tray is 200 paper sheets and the number of remaining paper sheets in one copy when the shift tray is full is 100 paper sheets, 200−100=100≥0, and, therefore, "proof tray paper ejection possibility" becomes "possible". That is, a remaining number of stackable paper sheets is obtained by subtracting the remaining number of paper sheets to be ejected in a copy being ejected, and the number of paper sheets of the number of stackable copies, from the remaining number of stackable paper sheets at the time of near full. The obtained remaining number of stackable paper sheets and the number of paper sheets that can be stacked on the proof tray are added together, to obtain the total number of paper sheets that can be ejected. When the obtained total number of paper sheets that can be ejected is greater than or equal to the number of paper sheets of one copy, "proof tray paper ejection possibility" becomes "possible".

Table 4 is an example of switching determination information. Table 5 indicates an example of a method of determining the switching determination information based on the paper eject determination information.

paper eject destination. As indicated in Table 4, items of the switching determination information include "paper eject tray switching timing" and "paper eject tray switching destination". The determination methods indicated in Table 5 are examples.

Note that the determination method of "paper eject tray switching destination" may be changed according to "paper eject tray switching timing". For example, when the "paper eject tray switching timing" is "when full", if the "number of remaining paper sheets of one copy at time of full

TABLE 4

| ITEM NAME | VALUE |
| --- | --- |
| PAPER EJECT TRAY SWITCHING TIMING | WHEN FULL |
| PAPER EJECT TRAY SWITCHING DESTINATION | PROOF |

TABLE 5

| ITEM NAME | VALUE | DETERMINATION METHOD |
| --- | --- | --- |
| PAPER EJECT TRAY SWITCHING TIMING | WHEN FULL | PROOF TRAY PAPER EJECTION POSSIBILITY = POSSIBLE AND NUMBER OF STACKABLE COPIES ≤ NUMBER OF REMAINING COPIES AND NUMBER OF PAPER SHEETS THAT CAN BE STACKED ON SHIFT TRAY ≥ 0 |
| | AFTER EJECTING NUMBER OF STACKABLE COPIES | PROOF TRAY PAPER EJECTION POSSIBILITY = NOT POSSIBLE AND REMAINING NUMBER OF STACKABLE PAPER SHEETS ≥ 0 |
| | AFTER EJECTING NUMBER OF REMAINING PAPER SHEETS TO BE EJECTED OF COPY BEING EJECTED | REMAINING NUMBER OF STACKABLE PAPER SHEETS ≥ 0 AND PROOF TRAY PAPER EJECTION POSSIBILITY = NOT POSSIBLE |
| | NONE | BECOME FULL IN MIDDLE OF COPY: NO AND NUMBER OF STACKABLE COPIES ≥ NUMBER OF REMAINING COPIES OR PROOF TRAY PAPER EJECTION POSSIBILITY = NOT POSSIBLE AND NUMBER OF PAPER SHEETS THAT CAN BE EJECTED TO SHIFT TRAY < 0 |
| PAPER EJECT TRAY SWITCHING DESTINATION | PROOF | PROOF TRAY PAPER EJECTION POSSIBILITY = POSSIBLE AND BECOME FULL IN MIDDLE OF COPY: YES |
| | ANOTHER STACKER | PROOF TRAY PAPER EJECTION POSSIBILITY = NOT POSSIBLE OR BECOME FULL IN MIDDLE OF COPY: NO |
| | NONE | IN CASE OF SWITCHING TIMING = NONE, ETC. |

The determining unit 1009 generates the switching determination information as indicated in Table 4, by the calculation condition or method indicated in Table 5 based on the paper eject determination information. The switching determination information is information for determining the paper eject destination tray or the switching timing of the ejection" is 0 and the "number of remaining copies" is 1 or more, "another stacker" is determined to be the "paper eject tray switching destination".

Table 6 indicates examples of the paper eject determination information and the switching determination information, when the paper eject state information is given.

TABLE 6

| INFORMATION NAME | ITEM NAME | VALUE | | | |
| --- | --- | --- | --- | --- | --- |
| | | EXAMPLE 1 | EXAMPLE 2 | EXAMPLE 3 | EXAMPLE 4 |
| PAPER EJECT STATE INFORMATION | REMAINING NUMBER OF STACKABLE PAPER SHEETS AT TIME OF NEAR FULL | 1000 PAPER SHEETS | 500 PAPER SHEETS | 600 PAPER SHEETS | 500 PAPER SHEETS |
| | NUMBER OF REMAINING PAPER SHEETS TO BE EJECTED OF COPY THAT IS BEING EJECTED | 50 PAPER SHEETS | 350 PAPER SHEETS | 50 PAPER SHEETS | 900 PAPER SHEETS |
| | NUMBER OF PAPER SHEETS PER COPY | 150 PAPER SHEETS | 400 PAPER SHEETS | 150 PAPER SHEETS | 1000 PAPER SHEETS |
| | NUMBER OF REMAINING COPIES | 20 COPIES | 10 COPIES | 2 COPIES | 10 COPIES |
| | NUMBER OF PAPER SHEETS THAT CAN BE STACKED ON PROOF TRAY | 200 PAPER SHEETS | 200 PAPER SHEETS | 200 PAPER SHEETS | 200 PAPER SHEETS |

TABLE 6-continued

| INFORMATION NAME | ITEM NAME | VALUE | | | |
|---|---|---|---|---|---|
| | | EXAMPLE 1 | EXAMPLE 2 | EXAMPLE 3 | EXAMPLE 4 |
| PAPER EJECT DETERMINATION INFORMATION | FULL IN MIDDLE OF COPY | YES | YES | NO | YES |
| | PROOF TRAY PAPER EJECTION POSSIBILITY | POSSIBLE | NOT POSSIBLE | POSSIBLE | NOT POSSIBLE |
| | NUMBER OF STACKABLE COPIES | 6 COPIES | 0 COPIES | 3 COPIES | 0 COPIES |
| | NUMBER OF REMAINING PAPER SHEETS IN ONE COPY AT TIME OF FULL EJECTION | 100 PAPER SHEETS | 250 PAPER SHEETS | 50 PAPER SHEETS | 400 PAPER SHEETS |
| | REMAINING NUMBER OF STACKABLE PAPER SHEETS | 50 PAPER SHEETS | 150 PAPER SHEETS | 250 PAPER SHEETS | −400 PAPER SHEETS |
| | NUMBER OF PAPER SHEETS THAT CAN BE EJECTED TO SHIFT TRAY | 950 PAPER SHEETS | 150 PAPER SHEETS | 550 PAPER SHEETS | −400 PAPER SHEETS |
| SWITCHING DETERMINATION INFORMATION | PAPER EJECT TRAY SWITCHING TIMING | WHEN FULL | AFTER EJECTING REMAINING PAPER SHEETS TO BE EJECTED OF COPY BEING EJECTED | AFTER EJECTING NUMBER OF NUMBER OF STACKABLE COPIES | NONE |
| | PAPER EJECT TRAY SWITCHING DESTINATION | PROOF TRAY | ANOTHER STACKER | ANOTHER STACKER | NONE |

FIG. 14 is a diagram for describing a setting screen of the paper eject destination changing process according to the embodiment of the present invention. As illustrated in FIG. 14, when the UI unit 1006 receives input from the user, the setting of the paper eject destination switching process as "initial setting: full detection operation setting", can be specified as "setting not to divide copy", "setting for switching at time of paper ejection", "operation when unable to retreat", or "setting of operation after paper ejection".

When "set" is set to "setting not to divide copy", the image forming apparatus 1000 detects near full and performs an operation not to cause full in the middle of ejecting a copy. On the other hand, when "not set" is set to "setting not to divide copy", the image forming apparatus 1000 does not detect near full and performs an operation to eject paper sheets until the full state.

The "setting for switching at time of paper ejection" may be set in the case where the "setting not to divide copy" is "set". In the case where "retreat to proof tray" is set for "setting for switching at time of paper ejection", after ejecting paper sheets to the shift tray 102 to the full state, the image forming apparatus 1000 ejects the remaining paper sheets in the copy to the proof tray 101 if possible. When "only stacker" is set as "setting for switching at time of paper ejection", the image forming apparatus 1000 ejects only the number of copies that can be ejected to the shift tray 102, and subsequently, the image forming apparatus 1000 switches the paper ejection destination to another stacker or stops the paper ejection, so that a copy is not divided.

"Operation when unable to retreat" can be set when "setting for switching at time of paper ejection" is set as "retreat to proof tray". When "eject only number of copies that can be ejected" is set to "operation when unable to retreat", the image forming apparatus 1000 ejects only a number of copies that can be ejected to the shift tray 102 when it is not possible to retreat to the proof tray 101. When "eject to proof tray to full state" is set for "operation when unable to retreat", the image forming apparatus 1000 ejects paper sheets up to the number of stackable paper sheets to the proof tray 101.

"Setting of operation after paper ejection" can be set in a case where "set" is set for "setting not to divide copy". When "next stacker" is set for "setting of operation after paper ejection", the image forming apparatus 1000 ejects paper sheets to the shift tray 102 up to a break between copies, and then switches the connection destination to another stacker and continues to eject paper sheets to the other stacker. When "none (stop)" is set for "setting of operation after paper ejection", the image forming apparatus 1000 ejects paper sheets to the shift tray 102 up to a break between copies, and then stops ejecting paper sheets, and waits for an instruction from the user.

As described above, according to the embodiment of the present invention, in executing a print job for printing a plurality of copies, the printing system 1 monitors the stacked state of paper sheets on the shift tray 102 of the stacker 100, and when the printing system 1 detects near full, the printing system 1 calculates whether the remaining number of paper sheets in a copy being printed can be ejected to the shift tray 102 and the proof tray 101. When the remaining number of paper sheets of the copy can be ejected, the printing system 1 ejects the paper sheets to the shift tray 102 to a full state, and ejects the remaining paper sheets to the proof tray 101, so that the paper eject destination is not switched to another stacker in the middle of a copy, and the shift tray 102 is used up to a full state so that the stacker capacity is not wasted.

That is, when a copy formed of a plurality of paper sheets is printed, by detecting the state of paper sheets stacked on the paper eject tray, it is possible to collectively eject a whole single copy by using the stacker capacity without wasting the stacker capacity.

Note that in the embodiment of the present invention, a copy is an example of a document. The shift tray 102-1 is an example of a first paper eject tray. The proof tray 101-1 is an example of a second paper eject tray. The shift tray 102-2 is an example of a third paper eject tray. The engine unit 1010 is an example of a printing unit.

According to one embodiment of the present invention, it is possible for a whole single copy to be collectively ejected without wasting the stacker capacity, by detecting the state of paper sheets stacked on a paper eject tray, when printing a copy including a plurality of paper sheets.

The printing system and the printing method are not limited to the specific embodiments described in the detailed description, and variations and modifications may be made without departing from the spirit and scope of the present invention.

What is claimed is:

1. A printing system for executing a print job by printing a plurality of copies of a document including a plurality of paper sheets, the printing system including a first paper eject tray and a second paper eject tray to which paper sheets are ejected after the first paper eject tray, the second paper eject tray being a tray to which a smaller number of paper sheets can be ejected compared to the first paper eject tray, the printing system comprising:

a hardware processor configured to
eject the plurality of paper sheets of the document to the first paper eject tray or the second paper eject tray when printing the document;
detect a full state or a near full state based on a number of paper sheets ejected to the first paper eject tray, the near full state being a predetermined number of paper sheets less than the full state;
determine whether a total ejectable paper sheet number is greater than or equal to a number of paper sheets of a next copy of the document, in response to detecting the near full state while printing the plurality of copies of the document, the total ejectable paper sheet number being obtained by adding together a number of paper sheets that can be ejected to the first paper eject tray and a number of paper sheets that can be ejected to the second paper eject tray when the near full state is detected; and
eject the paper sheets of the next copy to the first paper eject tray until the first paper eject tray is full and subsequently to the second paper eject tray, in response to detecting that the total ejectable paper sheet number is greater than or equal to the number of paper sheets of the next copy.

2. The printing system according to claim 1, wherein the hardware processor is further configured to:
determine whether a remaining number of paper sheets of the document that are not yet printed and one or more copies of another document can be ejected, according to the number of paper sheets that can be ejected to the first paper eject tray, in response to detecting the near full state while printing the plurality of copies of the document, and
calculate a number of copies of the another document that can be ejected.

3. The printing system according to claim 2, further comprising:
a third paper eject tray, wherein
the hardware processor is further configured to
eject the remaining number of paper sheets of the document and the calculated number of copies of the another document, to the first paper eject tray until the first paper eject tray is full and subsequently to the second paper eject tray, and subsequently switch a paper ejection destination of any document included in the print job that is not yet printed, to the third paper eject tray.

4. The printing system according to claim 1, wherein the hardware processor is further configured to:
determine whether a remaining number of paper sheets of the document that are not yet printed and one or more copies of another document can be ejected, according to the total ejectable paper sheet number obtained by adding together the number of paper sheets that can be ejected to the first paper eject tray and the number of paper sheets that can be ejected to the second paper eject tray when the near full state is detected, in response to detecting the near full state while printing the plurality of copies of the document, and
calculate a number of copies of the another document that can be ejected.

5. The printing system according to claim 4, further comprising:
a third paper eject tray, wherein
the hardware processor is further configured to
determine whether the remaining number of paper sheets of the document that are not yet printed and the one or more copies of the another document can be ejected, according to the total ejectable paper sheet number obtained by adding together the number of paper sheets that can be ejected to the first paper eject tray and the number of paper sheets that can be ejected to the second paper eject tray when the near full state is detected, in response to detecting the near full state while printing the plurality of copies of the document, and
in response to determining that the ejection is not possible, interrupt the ejecting of the remaining number of paper sheets of the document and the one or more copies of the another document before the first paper eject tray becomes full, and switch a paper ejection destination of any document included in the print job that is not yet printed, to the third paper eject tray.

6. The printing system according to claim 5, wherein the hardware processor is further configured to:
select a setting such that the paper ejection destination is not switched to the third paper eject tray while printing a copy of any document, and
select a setting whether to switch the paper ejection destination to the second paper eject tray when the setting of the paper ejection destination not being switched to the third paper eject tray while printing a copy of any document, is selected.

7. A printing method executed by a printing system for executing a print job by printing a plurality of copies of a document including a plurality of paper sheets, the printing system including a first paper eject tray and a second paper eject tray to which paper sheets are ejected after the first paper eject tray, the second paper eject tray being a tray to which a smaller number of paper sheets can be ejected compared to the first paper eject tray, the printing method comprising:
ejecting the plurality of paper sheets of the document to the first paper eject tray or the second paper eject tray when printing the document;
detecting a full state or a near full state based on a number of paper sheets ejected to the first paper eject tray, the near full state being a predetermined number of paper sheets less than the full state;
determining whether a total ejectable paper sheet number is greater than or equal to a number of paper sheets of a next copy of the document, in response to detecting the near full state while printing the plurality of copies of the document, the total ejectable paper sheet number being obtained by adding together a number of paper sheets that can be ejected to the first paper eject tray and a number of paper sheets that can be ejected to the second paper eject tray when the near full state is detected; and ejecting the paper sheets of the next copy to the first paper eject tray until the first paper eject tray is full and subsequently to the second paper eject tray, in response to detecting that the total ejectable paper sheet number is greater than or equal to the number of paper sheets of the next copy.

8. A non-transitory computer-readable recording medium storing a program that causes a computer to execute a process performed in a printing system for executing a print job by printing a plurality of copies of a document including a plurality of paper sheets, the printing system including a first paper eject tray and a second paper eject tray to which paper sheets are ejected after the first paper eject tray, the second paper eject tray being a tray to which a smaller number of paper sheets can be ejected compared to the first paper eject tray, the process comprising:

ejecting the plurality of paper sheets of the document to the first paper eject tray or the second paper eject tray when printing the document;

detecting a full state or a near full state based on a number of paper sheets ejected to the first paper eject tray, the near full state being a predetermined number of paper sheets less than the full state;

determining whether a total ejectable paper sheet number is greater than or equal to a number of paper sheets of a next copy of the document, in response to detecting the near full state while printing the plurality of copies of the document, the total ejectable paper sheet number being obtained by adding together a number of paper sheets that can be ejected to the first paper eject tray and a number of paper sheets that can be ejected to the second paper eject tray when the near full state is detected; and ejecting the paper sheets of the next copy to the first paper eject tray until the first paper eject tray is full and subsequently to the second paper eject tray, in response to detecting that the total ejectable paper sheet number is greater than or equal to the number of paper sheets of the next copy.

\* \* \* \* \*